(12) United States Patent
Yang et al.

(10) Patent No.: US 11,289,936 B2
(45) Date of Patent: Mar. 29, 2022

(54) WIRELESS BATTERY CHARGING WITH IMPROVED EFFICIENCY

(71) Applicant: Huawei Technologies Co., Ltd., Shenzhen (CN)

(72) Inventors: Songnan Yang, Frisco, TX (US); Xiaolin Mao, Cupertino, CA (US); Baoshan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 16/555,829

(22) Filed: Aug. 29, 2019

(65) Prior Publication Data

US 2020/0076222 A1 Mar. 5, 2020

Related U.S. Application Data

(63) Continuation of application No. PCT/CN2019/084617, filed on Apr. 26, 2019.
(Continued)

(51) Int. Cl.
*H02J 7/04* (2006.01)
*H02J 7/02* (2016.01)
(Continued)

(52) U.S. Cl.
CPC .............. *H02J 7/025* (2013.01); *H02J 7/045* (2013.01); *H02J 50/12* (2016.02); *H04B 5/0037* (2013.01); *H02J 7/0071* (2020.01)

(58) Field of Classification Search
USPC ........................................................ 320/108
See application file for complete search history.

(56) References Cited

U.S. PATENT DOCUMENTS 9,973,039 B2 5/2018 Morreale et al.
2008/0180564 A1 7/2008 Yamaji
(Continued)

FOREIGN PATENT DOCUMENTS

CN 101783599 A 7/2010
CN 101965676 A 2/2011
(Continued)

OTHER PUBLICATIONS

CN 201910345901.1—Office Action dated Apr. 24, 2020, 11 pages.
(Continued)

*Primary Examiner* — Bryce M Aisaka
(74) *Attorney, Agent, or Firm* — Vierra Magen Marcus LLP

(57) ABSTRACT

Described herein are wireless battery charging systems and methods for use therewith. Such a system can include a wireless power receiver (RX) that receives power wirelessly from a wireless power transmitter (TX) and in dependence thereon produces a DC output voltage (Vout). The system can also include a closed-loop charger and an open-loop charger each including a voltage input terminal and a voltage output terminal. The voltage input terminal of each of the chargers accepts the output voltage (Vout) from the wireless power RX. The voltage output terminal of each of the chargers is couplable to a terminal of the battery to be charged. A controller selectively enables one of the closed-loop or open-loop chargers at a time so that during a first set of charging phases the closed-loop charger is used to charge the battery, and during a second set of the charging phases the open-loop charger is used.

26 Claims, 12 Drawing Sheets

Related U.S. Application Data

(60) Provisional application No. 62/724,371, filed on Aug. 29, 2018.

(51) Int. Cl.
*H02J 50/12* (2016.01)
*H04B 5/00* (2006.01)
*H02J 7/00* (2006.01)

(56) References Cited

U.S. PATENT DOCUMENTS

| | | |
|---|---|---|
| 2009/0230934 A1 | 9/2009 | Hooijschuur et al. |
| 2012/0223674 A1 | 9/2012 | Choi et al. |
| 2014/0070773 A1* | 3/2014 | Cottrill ............... A61N 1/3787 320/150 |
| 2015/0039051 A1 | 2/2015 | Popovic et al. |
| 2015/0054351 A1 | 2/2015 | Deguchi et al. |
| 2016/0056664 A1 | 2/2016 | Partovi |
| 2016/0056665 A1 | 2/2016 | Hatanaka et al. |
| 2017/0117717 A1 | 4/2017 | Pagano et al. |
| 2018/0013303 A1 | 1/2018 | Wu et al. |
| 2018/0115157 A1 | 4/2018 | Chan et al. |
| 2018/0226806 A1 | 8/2018 | Pagano et al. |
| 2018/0309315 A1 | 10/2018 | Der et al. |
| 2019/0305560 A1 | 10/2019 | Wang et al. |
| 2020/0044482 A1* | 2/2020 | Partovi ............... G06F 1/1683 |

FOREIGN PATENT DOCUMENTS

| | | |
|---|---|---|
| CN | 105144541 A | 12/2015 |
| CN | 107979152 A | 5/2018 |
| CN | 207339384 U | 5/2018 |
| CN | 108183559 A | 6/2018 |
| CN | 207518335 U | 6/2018 |
| CN | 207625303 U | 7/2018 |
| WO | 2009112900 A1 | 9/2009 |

OTHER PUBLICATIONS

U.S. Appl. No. 16/555,695, filed Aug. 29, 2019.
International Search Report dated Aug. 8, 2019, in PCT Patent Application No. PCT/CN2019/084571, 9 pages.
International Search Report dated Jun. 28, 2019, in PCT Patent application No. PCT/CN2019/048617, 9 pages.
Extended European Search Report dated Sep. 16, 2021.
Notice of Allowance dated Sep. 21, 2021, U.S. Appl. No. 16/555,695, filed Aug. 29, 2019.
Examination Report dated Feb. 1, 2022, India Patent Application No. 202147010920.

* cited by examiner

WIRELESS BATTERY CHARGING WITH IMPROVED EFFICIENCY

PRIORITY CLAIM

This application is a continuation of PCT Patent Application No. PCT/CN2019/084617 filed Apr. 26, 2019 by Yang et al., entitled "WIRELESS BATTERY CHARGING WITH IMPROVED EFFICIENCY," which claims priority to U.S. Provisional Patent Application No. 62/724,371 filed Aug. 29, 2018 by Yang et al., entitled "WIRELESS BATTERY CHARGING WITH IMPROVED EFFICIENCY," both of which are incorporated by reference herein in their entirety.

This application claims priority to U.S. Provisional Patent Application No. 62/724,371 filed Aug. 29, 2018 by Yang et al., entitled "WIRELESS BATTERY CHARGING WITH IMPROVED EFFICIENCY," which is incorporated by reference in its entirety.

TECHNICAL FIELD

The disclosure generally relates to wireless battery charging systems and methods for use therewith.

BACKGROUND

In a typical Qi-standard wireless battery charging system, an adapter converts power from an AC voltage to a DC voltage and supplies the DC voltage to a wireless power transmitter (TX). The wireless power TX transmits power wirelessly via an inductive coupling to a wireless power receiver (RX), which rectifies the power and supplies a DC voltage to a charger. The charger charges a rechargeable battery with a regulated current or voltage.

Communications are used to control the system's operation. In the Qi-standard, which was developed by the Wireless Power Consortium (WPC), communication from the wireless power RX to the wireless power TX is accomplished by modulating a load seen by a coil of the wireless power RX, and communication from the wireless power TX to the wireless power RX is accomplished by modulating the frequency of the transmitted power. Both of the aforementioned types of communications are in-band communications. The communication between the wireless power TX and the adapter can be, for example, through wires in a universal serial bus (USB) cable.

Typically, the wireless power RX provides an output voltage (Vout) to a buck charger that steps down the output voltage (Vout) to a battery charging voltage (Vbat) that is used to charge a rechargeable battery of a battery powered electronic device. A buck charger typically has a maximum efficiency in the low 90s in percentage. When using a buck charger, the wasted energy often causes the heating-up of the battery-powered device that includes the buck charger, such as a mobile smartphone, which is undesirable.

SUMMARY

According to one aspect of the present disclosure, a wireless battery charging system is provided for wirelessly charging a battery of an electronic device including a load powered by the battery. The system includes an adaptor, a wireless power transmitter (TX), a wireless power receiver (RX), first and second chargers, and a controller. The adaptor is configured to convert an AC voltage, received from an AC power supply, into a DC voltage. The wireless power TX is configured to accept an input voltage (Vin) and in dependence thereon transmit power wirelessly to a wireless power receiver (RX), wherein the input voltage (Vin) accepted by the wireless power TX is based on the DC voltage produced by the adaptor. The input voltage (Vin) accepted by the wireless power TX being based on the DC voltage produced by the adaptor can mean that the input voltage (Vin) accepted by the wireless power TX is simply the DC voltage produced by the adaptor, or alternatively, can mean that the input voltage (Vin) accepted by the wireless power TX is produced by a further DC-DC converter that is between the adaptor and the wireless power TX (wherein the further DC-DC converter receives the DC voltage produced by the adaptor and generates the input voltage (Vin) provided to the wireless power TX). The wireless power RX is configured to receive power wirelessly from the wireless power TX and in dependence thereon produce a DC output voltage (Vout). The first and second chargers each include a voltage input terminal and a voltage output terminal. The voltage input terminal of each of the first and second chargers accepts the output voltage (Vout) from the wireless power RX. The voltage output terminal of each of the first and second chargers is couplable to a terminal of the battery that is to be charged. The first charger comprises closed-loop DC-DC converter. The second charger comprises an open-loop DC-DC converter. The controller is configured to selectively enable one of the first or second chargers at a time so that during a first set of charging phases the first charger is used to charge the battery, and during a second set of the charging phases the second charger is used to charge the battery.

Optionally, in any of the preceding aspects, the closed-loop DC-DC converter of the first charger comprises a buck charger, and the open-loop DC-DC converter of the second charger comprises a switched capacitor charger, a load switch charger, or a flash charging charger.

Optionally, in any of the preceding aspects, the closed-loop DC-DC converter of the first charger comprises a buck charger, the open-loop DC-DC converter of the second charger comprises a switched capacitor charger, and the charging phases include a pre-charge phase, a constant current buck phase, a constant current switched capacitor phase, a constant voltage switched capacitor phase, and a constant voltage buck phase. The controller is configured to enable the first charger and disable the second charger during the pre-charge phase, the constant current buck phase, and the constant voltage buck phase. The controller is configured to enable the second charger and disable the first charger during the constant current switched capacitor phase and the constant voltage switched capacitor phase.

Optionally, in any of the preceding aspects, the pre-charge phase corresponds to when a battery charging voltage (Vbat) is below a first voltage threshold (Vlow); the constant current buck phase corresponds to when the battery charging voltage (Vbat) is between the first voltage threshold (Vlow) and a second voltage threshold (Vsc_min), the constant current switched capacitor phase corresponds to when the battery charging voltage (Vbat) is between the second voltage threshold (Vsc_min) and a third voltage threshold (Vcv_buck), the constant voltage switched capacitor phase corresponds to when the battery charging voltage (Vbat) is greater than a fourth voltage threshold (Vcv_sc), and the constant voltage buck phase corresponds to when the battery charging voltage (Vbat) is greater than the third voltage threshold (Vcv_buck) or the battery charging current (Ichg) is less than a current threshold (Isc_min).

Optionally, in any of the preceding aspects, during the constant current switch capacitor phase, the input voltage (Vin) provided to the wireless power TX is adjusted to cause a battery charging current to stay close to a target charging current, and the output voltage (Vout) produced by the wireless power RX is adjusted to cause a voltage gain of the system to stay close to a target voltage gain, the voltage gain of the system being a ratio of the output voltage (Vout) to the input voltage (Vin).

Optionally, in any of the preceding aspects, during the constant current switch capacitor phase, the input voltage (Vin) provided to the wireless power TX is adjusted to cause a battery charging current to stay close to a target charging current, and the output voltage (Vout) produced by the wireless power RX is adjusted to cause an operating frequency of the system to stay close to a target operating frequency.

Optionally, in any of the preceding aspects, during the constant current switch capacitor phase, the output voltage (Vout) produced by the wireless power RX is adjusted to cause a battery charging current to stay close to a target charging current, and the input voltage (Vin) provided to the wireless power TX is adjusted to cause a voltage gain of the system to stay close to a target voltage gain, the voltage gain of the system being a ratio of the output voltage (Vout) to the input voltage (Vin).

Optionally, in any of the preceding aspects, during the constant current switch capacitor phase, the output voltage (Vout) produced by the wireless power RX is adjusted to cause a battery charging current to stay close to a target charging current, and the input voltage (Vin) provided to the wireless power TX is adjusted to cause the operating frequency of the system to stay close to a target operating frequency.

Optionally, in any of the preceding aspects, during the constant current switch capacitor phase, the output voltage (Vout) produced by the wireless power RX is adjusted to cause a battery charging current to stay close to a target charging current, while the input voltage (Vin) provided to the wireless power TX is fixed.

Optionally, in any of the preceding aspects, during the constant voltage switch capacitor phase, the input voltage (Vin) provided to the wireless power TX is adjusted to cause the battery charging voltage to stay close to a target voltage, and the output voltage (Vout) produced by the wireless power RX is adjusted to cause a voltage gain of the system to stay close to a target voltage gain, the voltage gain of the system being a ratio of the output voltage (Vout) to the input voltage (Vin).

Optionally, in any of the preceding aspects, during the constant voltage switch capacitor phase, the input voltage (Vin) provided to the wireless power TX is adjusted to cause the battery charging voltage to stay close to a target voltage, and the output voltage (Vout) produced by the wireless power RX is adjusted to cause an operating frequency of the system to stay close to a target operating frequency.

Optionally, in any of the preceding aspects, during the constant voltage switch capacitor phase, the output voltage (Vout) produced by the wireless power RX is adjusted to cause the battery charging voltage to stay close to a target voltage, and the input voltage (Vin) provided to the wireless power TX is adjusted to cause a voltage gain of the system to stay close to a target voltage gain, the voltage gain of the system being a ratio of the output voltage (Vout) to the input voltage (Vin).

Optionally, in any of the preceding aspects, during the constant voltage switch capacitor phase, the output voltage (Vout) produced by the wireless power RX is adjusted to cause the battery charging voltage to stay close to a target voltage, and the input voltage (Vin) provided to the wireless power TX is adjusted to cause an operating frequency of the system to stay close to a target operating frequency.

Optionally, in any of the preceding aspects, during the constant voltage switch capacitor phase, the output voltage (Vout) produced by the wireless power RX is adjusted to cause the battery charging voltage to stay close to a target voltage, while the input voltage (Vin) provided to the wireless power TX is fixed.

According to one other aspect of the present disclosure, a method is provided for wirelessly charging a battery of an electronic device including a load powered by the battery. The method includes converting an AC voltage, received from an AC power supply, into a DC voltage, wherein the converting is performed by an adaptor. The method also includes accepting, at a wireless power TX, an input voltage (Vin), wherein the input voltage (Vin) accepted by the wireless power TX is based on the DC voltage produced by the adaptor. The method further includes transmitting power wirelessly from the wireless power TX to a wireless power RX, wherein the transmitting is performed in dependence on the input voltage (Vin) provided to the wireless power TX. Further, the method includes receiving power wirelessly, at the wireless power RX, from the wireless power TX, and producing a DC output voltage (Vout) in dependence on the power wirelessly received by the wireless power RX. The method also includes during a first set of charging phases enabling a first charger and disabling a second charger and converting the DC output voltage (Vout) to a battery charging voltage (Vbat) using the first charger, the first charger comprising a closed-loop DC-DC converter. The method also includes during a second set of charging phases disabling the first charger and enabling the second charger and converting the DC output voltage (Vout) to the battery charging voltage (Vbat) using the second charger, the second charger comprising an open-loop DC-DC converter.

According to one other aspect of the present disclosure, a wireless battery charging subsystem is provided for wirelessly charging a battery of an electronic device including a load powered by the battery. The subsystem includes a wireless power RX, a closed-loop charger, an open-loop charger, and a controller. The wireless power RX is configured to receive power wirelessly from a wireless power TX and in dependence thereon produce a DC output voltage (Vout). The closed-loop charger and an open-loop charger each include a voltage input terminal and a voltage output terminal. The voltage input terminal of each of the chargers accepts the output voltage (Vout) from the wireless power RX. The voltage output terminal of each of the chargers is couplable to a terminal of the battery that is to be charged. The controller is configured to selectively enable one of the closed-loop or open-loop chargers at a time so that during a first set of charging phases the closed-loop charger is used to charge the battery, and during a second set of the charging phases the open-loop charger is used to charge the battery. Use of both the closed-loop and open-loop chargers provides for greater efficiency than using just the closed-loop charger. In certain embodiments, the closed-loop charger comprises a buck charger, and the open-loop charger comprises a switched capacitor charger.

According to one other aspect of the present disclosure, a method is provided for wirelessly charging a battery of an electronic device including a load powered by the battery. The method includes receiving power wirelessly, at a wireless power RX, from a wireless power TX. The method also includes producing a DC output voltage (Vout) in dependence on the power wirelessly received by the wireless power RX. The method further includes during a first set of charging phases enabling a closed-loop charger and disabling an open-loop charger and converting the DC output voltage (Vout) to a battery charging voltage (Vbat) using the closed-loop charger. The method also includes during a second set of charging phases disabling the closed-loop charger and enabling the open-loop charger and converting the DC output voltage (Vout) to the battery charging voltage (Vbat) using the open-loop charger. Use of both the closed-loop and open-loop chargers provides for greater efficiency than using just the closed-loop charger. In certain embodiments, the closed-loop charger comprises a buck charger, and the open-loop charger comprises a switched capacitor charger.

Embodiments of the present technology described herein provide improvements to existing wireless battery charging systems. Such embodiments can be used to increase the overall efficiency of a wireless battery charging system. Further, by reducing the wasted energy, such embodiments can reduce the undesirable heating-up of a battery powered device, such as a mobile smartphone. Additionally, such embodiments can reduce how long it takes to fully charge a battery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The present disclosure will now be described with reference to the figures, which in general relate to wireless battery charging systems for wirelessly charging a rechargeable battery of an electronic device that includes a load powered by the battery, and methods for use therewith.

Figure 1:
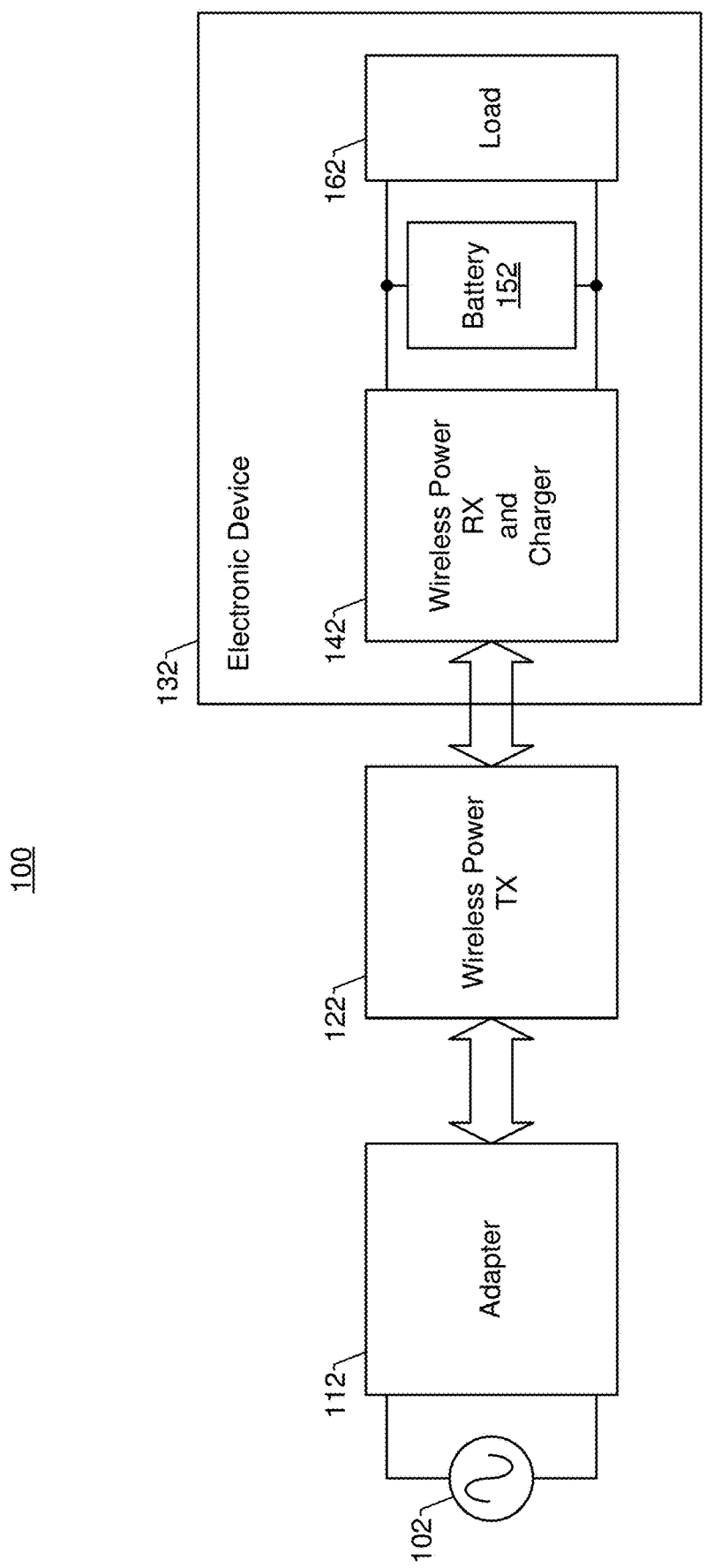
FIG. 1 illustrates an exemplary wireless battery charging system.

FIG. 1 illustrates an exemplary wireless battery charging system 100, which can be a Qi-standard wireless battery charging system, but is not limited thereto. The Qi-standard is an open interface standard developed by the Wireless Power Consortium (WPC) that defines wireless power transfer using inductive charging over distances of up to 4 cm (1.6 inches). A Qi-standard wireless battery charging system typically uses a charging pad and a compatible battery powered device, which is placed on top of the pad, charging via resonant inductive coupling.

Referring to FIG. 1, the exemplary wireless battery charging system 100 is shown as including an adaptor 112, a wireless power transmitter (TX) 122, and a wireless power receiver (RX) and charger 142. As can be appreciated from FIG. 1, the wireless power RX and charger 142 is shown as being part of an electronic device 132 that also includes a rechargeable battery 152 and a load 162 that is powered by the battery 152. Since the electronic device 132 is powered by a battery, the electronic device 132 can also be referred to as a battery-powered device 132. The load 162 can include, e.g., one or more processors, displays, transceivers, and/or the like, depending upon the type of the electronic device 132. The electronic device 132 can be, for example, a mobile smartphone, a tablet computer, or a notebook computer, but is not limited thereto. The battery 152, e.g., a lithium ion battery, can include one or more electrochemical cells with external connections provided to power the load 162 of the electronic device 132.

The adaptor 112 converts an alternating current (AC) voltage, received from an AC power supply 102, into a direct current (DC) input voltage (Vin). The AC power supply 102 can be provided by a wall socket or outlet or by a power generator, but is not limited thereto. The wireless power TX 122 accepts the input voltage (Vin) from the adaptor 112 and in dependence thereon transmits power wirelessly to the wireless power RX and charger 142. The wireless power TX 122 can be electrically coupled to the adaptor 112 via a cable that includes a plurality of wires, one or more of which can be used to provide the input voltage (Vin) from the adaptor 112 to the wireless power TX 122, and one or more of which can provide a communication channel between the adaptor 112 and the wireless power TX 122. The communication channel can allow for wired bi-directional communication between the adaptor 112 and the wireless power TX 122. The cable that electrically couples the adaptor 112 to the wireless power TX 122 can include a ground wire that provides for a common ground (GND). The cable between the adaptor 112 and the wireless power TX 122 is generally represented in FIG. 1 by a double-sided arrow extending between the adaptor 112 and the wireless power TX 122. Such a cable can be, e.g., a universal serial bus (USB) cable, but is not limited thereto.

The wireless power RX and charger 142, via an inductive coupling, receives power wirelessly from the wireless power TX 122 and uses the received power to charge the battery 152. The wireless power RX and charger 142 can also wirelessly communicate bi-directionally with the wireless power TX 122 using in-band communications defined by the Qi standard. In FIG. 1 a double-sided arrow extending between the wireless power TX 122 and the wireless power RX and charger 142 is used to generally represent the wireless transfer of power and communications therebetween.

Figure 2:
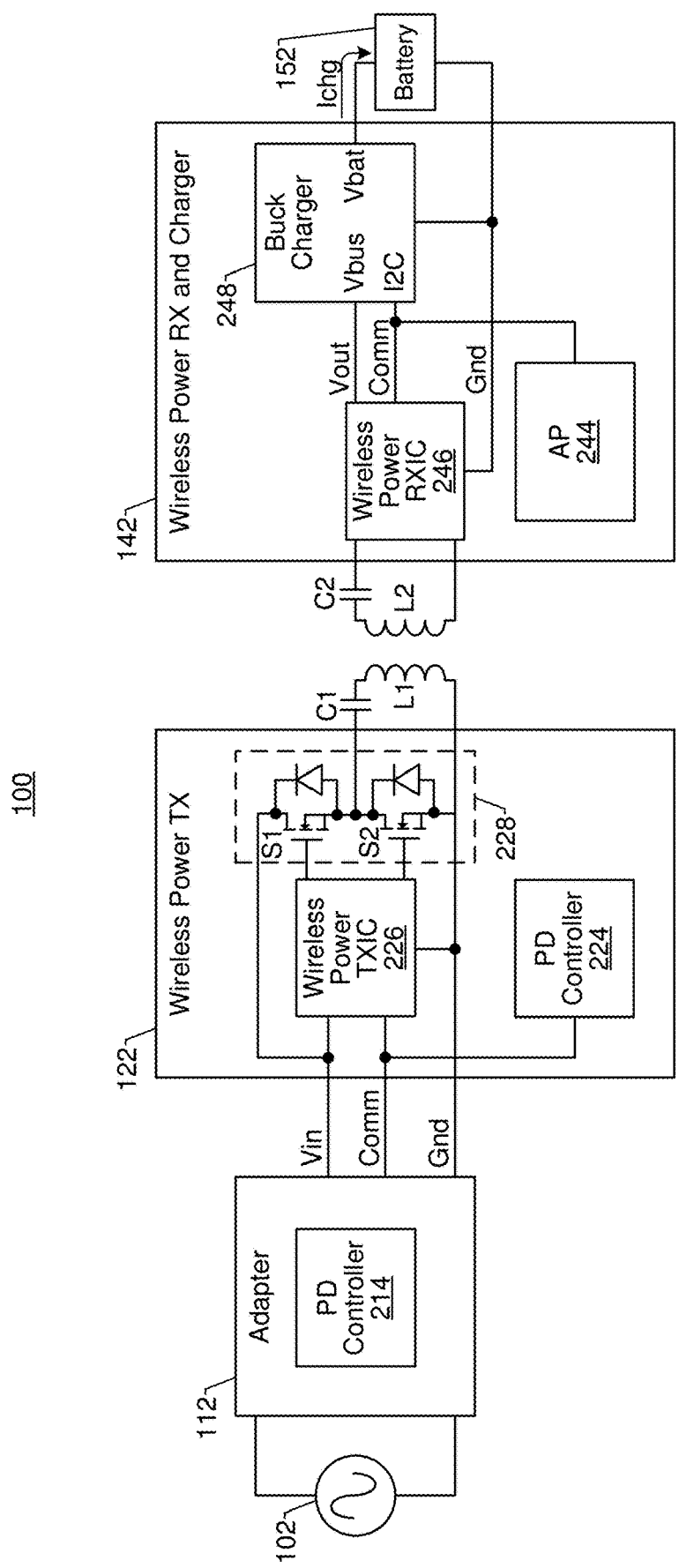
FIG. 2 illustrates additional details of the exemplary wireless battery charging system introduced in FIG. 1.

FIG. 2 illustrates additional details of the wireless battery charging system 100 introduced in FIG. 1. To make FIG. 2 less crowded, the load 162 that is powered by the battery 152 is not shown, and the electronic device 132 within which the wireless power RX and charger 142 is included is not shown. Referring to FIG. 2, the adaptor 112 is shown as including a power delivery (PD) controller 214. The adaptor 112 can include an AC/DC converter (not specifically shown) that converts the AC voltage provided by the power supply 102 to the DC input voltage (Vin) that is provided by the adaptor 112 to the wireless power TX 122. Such an AC/DC converter can be or include a full-wave rectifier, for example, but is not limited thereto. The PD controller 214 can include, e.g., a processor and a transceiver that sends and receives communication signals to and from the wireless power TX 122. In FIG. 2, the wireless power TX 122 is shown as including a PD controller 224, a wireless power transmitter integrated circuit (TXIC) 226, and a half-bridge inverter 228. The half-bridge inverter 228 is shown as being connected between a high voltage rail (that is at the input voltage (Vin)) and ground (GND). The PD controller 224 can include, e.g., a processor and a transceiver that sends and receives wireless communication signals to and from the adaptor 112. In accordance with certain embodiments, the functionality of the PD controller 224 can be integrated into the TXIC 226, in which case the TXIC 226 can be said to include a controller. The wireless power TXIC 226 is shown as accepting the input voltage (Vin) from the adaptor 112 and controlling switches (S1 and S2) of the half-bridge inverter 228. The switches S1 and S2 are opened and closed at a desired frequency to generate an alternating signal at an output between the switches. The output of the inverter 228 is connected to an inductor L1 through a resonance capacitor C1. Since the inductor L1 functions as a transmitter coil, the inductor L1 can also be referred to as a transmitter coil. A full-bridge inverter that includes four switches can be used in place of the half-bridge inverter 228, as is known in the art. Other variations are also possible, as known in the art. In certain embodiments, the TXIC 226 can include, e.g., a processor and a transceiver that sends and receives communication signals to and from the wireless power RXIC 246, or more generally, the wireless power RX and charger 142.

Still referring to FIG. 2, the wireless power RX and charger 142 is shown as including an application processor (AP) 244, a wireless power receiver integrated circuit (RXIC) 246, and a buck charger 248. The wireless power RXIC 246 is connected to an inductor L2 through a resonance capacitor C2. Since the inductor L2 functions as a receiver coil, the inductor L2 can also be referred to as a receiver coil. The inductors L1 and L2 provide for an inductive coupling between the wireless power RX 122 and the wireless power RX and charger 142, and more specifically, between the wireless power TXIC 226 and the wireless power RXIC 246. The inductive coupling can be used to transfer power from the wireless power TX 122 to the wireless power RX and charger 142, as well as to provide in-band bidirectional wireless communications therebetween. In the embodiment shown, power is wirelessly transferred from the wireless power TXIC 226 to the wireless power RXIC 246 using a single transmitter coil, but can alternatively be wirelessly transferred using more than one transmitter coil. Similarly, it is also possible that more than one receiver coil be used to wirelessly receive power at the receiving side of the inductive coupling. Other variations are also possible, as known in the art.

The wireless power RXIC 246 converts the AC voltage provided to it by the inductor L2 to a DC output voltage (Vout). The DC output voltage (Vout) is provided to the buck charger 248. The buck charger 248 can step down the output voltage (Vout) to an appropriate battery charging voltage (Vbat) that is used to charge the battery 152. For example, Vout may be 10 Volts (V), and Vbat may be 4.2V. For another example, Vout may be 10V, and Vbat may be 3.5V. These are just a few examples which are not intended to be limiting, as Vout and Vbat can have a myriad of different values. It would also be possible that the buck charger can step up the output voltage (Vout), i.e., working as boost charger, or maintain the output voltage (Vout) so that the battery charging voltage (Vbat) is the same as Vout in alternative embodiments.

The buck charger 248, which can also be referred to as a buck converter, is an example of a closed-loop charger, in that the voltage and/or current at its output (i.e., at the terminal that produces Vbat, which terminal can be referred to as the Vbat terminal) is adjusted based on feedback produced by the buck charger 248 itself. The AP 244, which can also be referred to as a controller, can send and receive communication signals to and from the wireless power RXIC 246 and the buck charger 248. In certain embodiments, the AP 244 can utilize Inter-Integrated Circuit (I2C) serial bus communications to communicate with the wireless power RXIC 246 and the buck charger 248, however other communication interfaces and protocols can alternatively be used. The AP 244 can be, e.g., a processor of the electronic device 132, which processor can also be used to run applications, control communications, and the like, but is not limited thereto. The buck charger 248 is shown as including a voltage input terminal, labeled Vbus, and a voltage output terminal, labeled Vbat. The voltage output terminal (labeled Vbat) is shown as being connected to a terminal of the rechargeable battery 152, which can also be referred to herein more succinctly as the battery 152. The buck charger 248 can charge the rechargeable battery 152 with a regulated current or voltage.

As noted above, a buck charger (e.g., 248) typically has a maximum efficiency in the low 90s percent, which results in wasted energy. This wasted energy can cause the heating-up of the battery powered device (e.g., 132), such as a mobile smartphone, within which the buck charger is located, which is undesirable. Additionally, this inefficiency causes charging to take longer than it would otherwise take if the efficiency were higher.

Certain embodiments of the present technology, described below, can be used to increase the overall efficiency of a wireless battery charging system. Such embodiments are beneficial because they can reduce the wasted energy and thereby reduce the heating-up of the battery powered device (e.g., 132), such as a mobile smartphone, within which the buck charger is located. Additionally, such embodiments can reduce how long it takes to fully charge a battery (e.g., 152).

Figure 3:
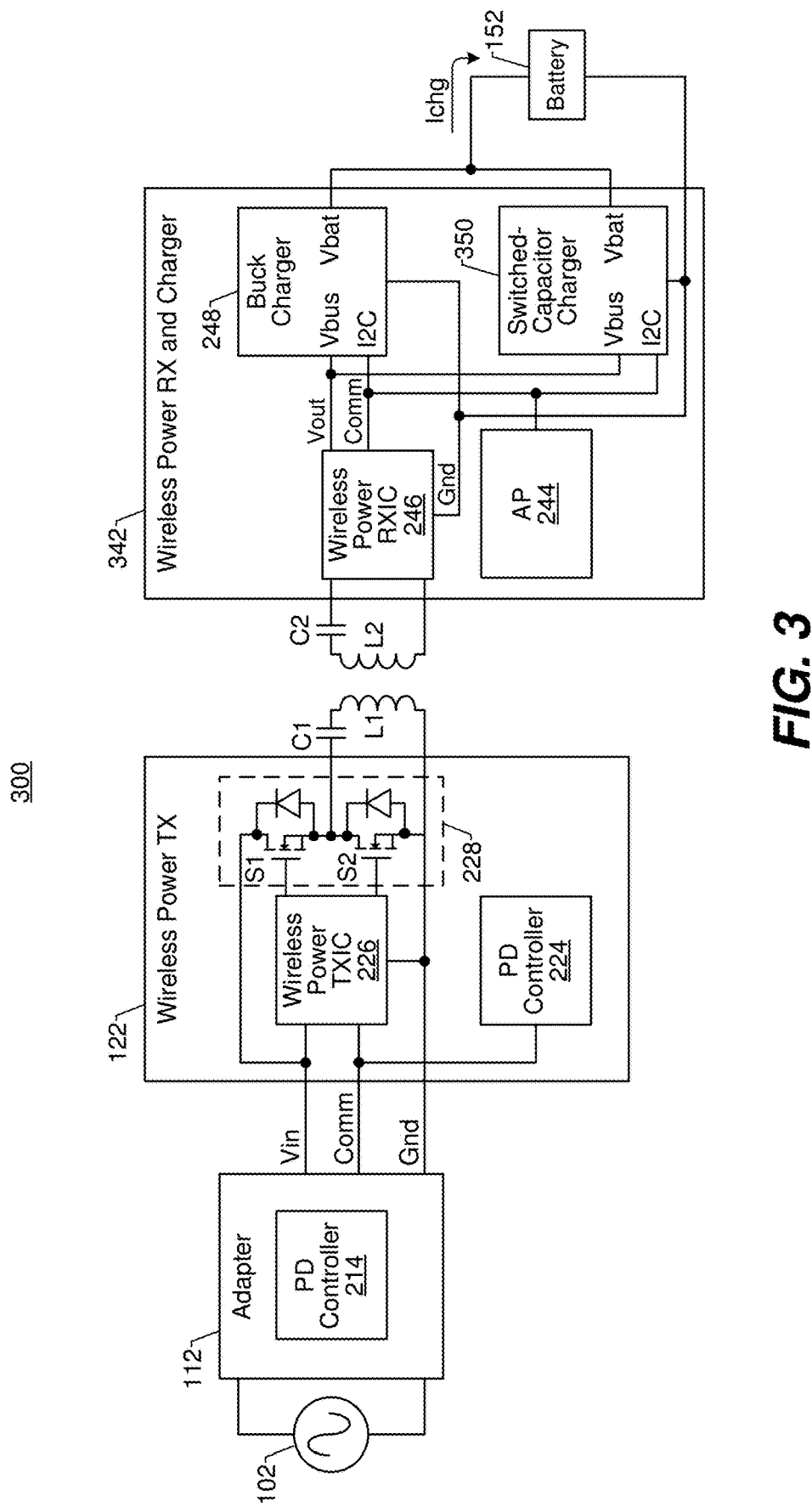
FIG. 3 illustrates a wireless battery charging system according to an embodiment of the present technology.

FIG. 3 illustrates a wireless battery charging system 300 according to an embodiment of the present technology. Elements in FIG. 3 that are the same or similar to those already discussed above with reference to FIGS. 1 and 2 are labeled the same and in certain instances are not discussed in detail because reference can be made to the above discussions of FIGS. 1 and 2.

Referring to FIG. 3, the exemplary wireless battery charging system 300 is shown as including an adaptor 112, a wireless power TX 122, and a wireless power RX and charger 342. The wireless power RX and charger 342 can be included within an electronic device (e.g., a mobile smartphone, a tablet computer, or a notebook computer, but not limited thereto) that also includes a rechargeable battery 152 and a load that is powered by the battery 152. The adaptor 112 includes a PD controller 214, and can include an AC/DC converter (not specifically shown) that converts the AC voltage provided by the power supply 102 to the DC input voltage (Vin) that is provided by the adaptor 112 to the wireless power TX 122. The PD controller 214 can include, e.g., a processor and a transceiver that sends and receives communication signals to and from the wireless power TX 122.

The wireless power TX 122 includes a PD controller 224, a wireless power TXIC 226, and an inverter 228. The PD controller 234 can include, e.g., a processor and a transceiver that sends and receives wireless communication signals to and from the adaptor 112. The wireless power TXIC 226 can accept the input voltage (Vin) from the adaptor 112 and controls switches (S1 and S2) of the inverter 228 to generate an alternating signal at an output thereof. Alternatively, a further DC-DC converter can be located between the adaptor 112 and the wireless power TX 122, the adaptor 112 can output a fixed DC voltage, and the further DC-DC converter can be controlled to adjust the input voltage (Vin) that is provided to the wireless power TX 122. The output of the inverter 228 is connected to the inductor L1 (which can also be referred to as a transmitter coil) through the resonance capacitor C1. A full-bridge inverter that includes four switches can be used in place of the half-bridge inverter 228, as is known in the art. Other variations are also possible, as known in the art.

Still referring to FIG. 3, the wireless power RX and charger 442 is shown as including an AP 244, a wireless power RXIC 246, a buck charger 248, and also a switched capacitor charger 350. A comparison between the wireless battery charging system 100 (discussed above with reference to FIGS. 1 and 2) and the wireless battery charging system 300 (shown in FIG. 3) is that the wireless battery charging system 300 also includes the switched capacitor charger 350. As will be described in additional detail below, the inclusion and selective use of the switched capacitor charger 350 (or an alternative open-loop high efficiency charger) increases the overall efficiency of the wireless battery charging system 300, which effectively reduces the heating-up of the battery powered device (within which the chargers 248 and 350 are located), and effectively reduces the total amount of time it takes to fully recharge a rechargeable battery (e.g., 152). A typical switched capacitor charger (e.g., 350) has an efficiency of 97%, which is more efficient than a typical buck charger (e.g., 248).

In FIG. 3, the wireless power RXIC 246 is connected to the inductor L2 (which can also be referred to as a receiver coil) through the resonance capacitor C2. The inductors L1 and L2 provide for an inductive coupling between the wireless power TXIC 226 and the wireless power RXIC 246, which inductive coupling is used to transfer power from the wireless power TX 122 to the wireless power RX and charger 142, as well as to prove wireless bidirectional communications therebetween. In the embodiment shown, power is wirelessly transferred from the wireless power TXIC 226 to the wireless power RXIC 246 using a single transmitter coil, but can alternatively be wirelessly transferred using more than one transmitter coil. Similarly, it is also possible that more than one receiving coil be used to wirelessly receive power at the receiving side of the inductive coupling. Other variations are also possible, as known in the art.

In accordance with certain embodiments of the present technology, during any given phase of a battery charging process (also referred to as a charging profile), only one of the two chargers 248 and 350 operates. As noted above, the buck charger 248, which can also be referred to as a buck converter, is an example of a closed-loop charger (that can also be referred to as a closed-loop DC-DC converter), in that the voltage and/or current at its output (i.e., at the Vbat terminal) is adjusted based on feedback produced by the buck charger 248 itself. By contrast, the switched capacitor charger 350 is an example of an open-loop charger (that can also be referred to as an open-loop DC-DC converter), in that the voltage and/or current at its output (i.e., at the Vbat terminal) is not adjusted based on feedback produced by the switched capacitor charger 350 itself. The buck charger 248 has better current and voltage regulation, and is employed during low power charging phases. The switch capacitor charger 350 does not have current and voltage regulation, and is employed during high power charging phases. It is noted the term Vbat is used both to refer to the output terminal of a charger (248 and 350), as well as the battery charging voltage output at that terminal, and the specific use of the term can be understood from the context of how the term is used.

Figure 4:
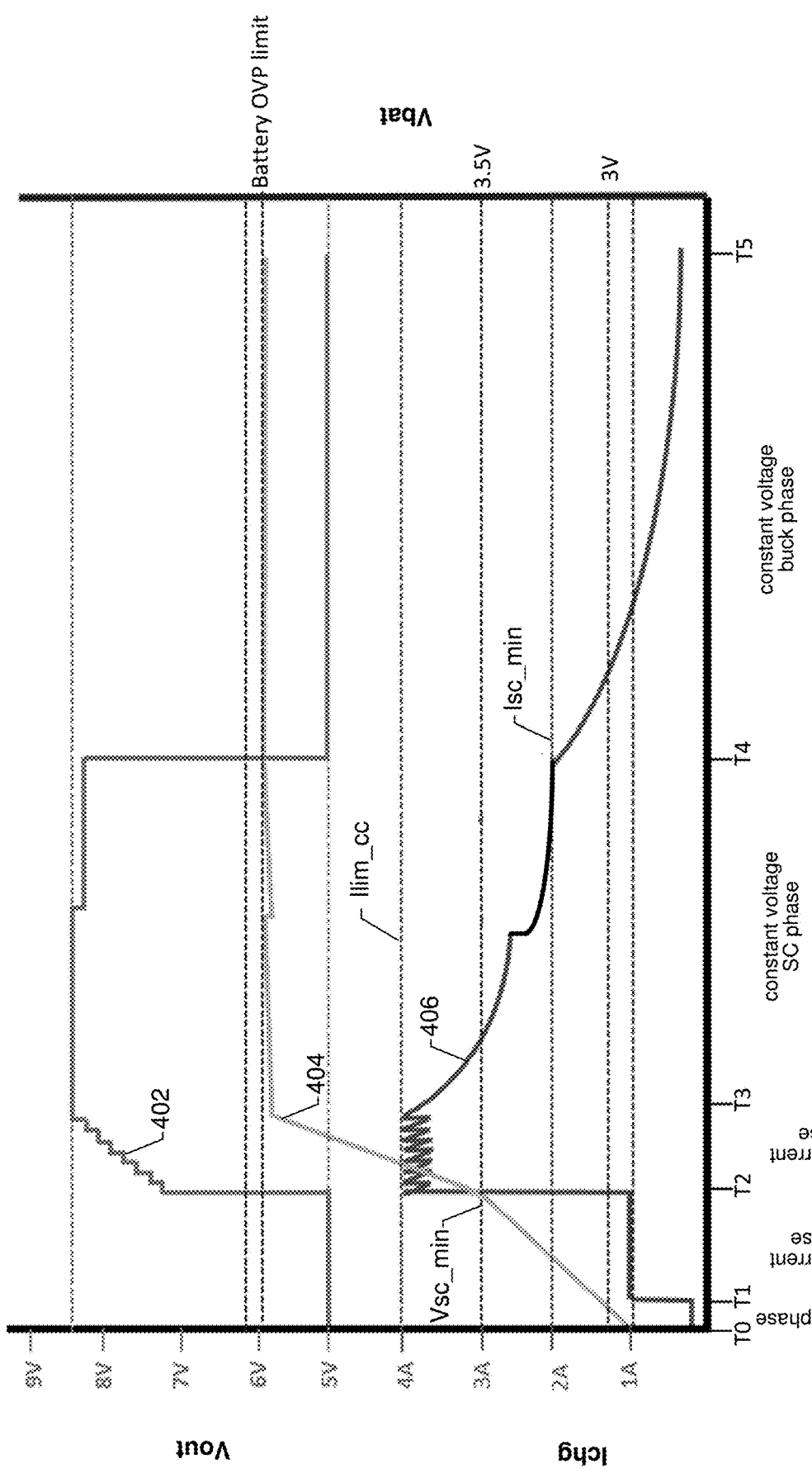
FIG. 4 illustrates a graph that shows an exemplary wireless battery charging profile for the wireless battery charging system shown in FIG. 3.

FIG. 4 shows an exemplary charging profile of the wireless battery charging system 300, accordance to an embodiment of the present technology. More specifically, the graph in FIG. 4 includes a horizontal axis (i.e., the x-axis) that corresponds to time, and a vertical axis (i.e., the y-axis) on the left that corresponds (at the lower portion) to the battery charging current (Ichg), and corresponds (at the upper portion) to the output voltage (Vout) of the wireless power RXIC 246 in FIG. 3. The vertical axis (i.e., the y-axis) on the right corresponds to the battery charging voltage (Vbat). The battery charging current (Ichg) is the current provided to the battery at the Vbat terminal of the enabled one of the chargers 248 or 350 in in FIG. 3. The battery charging voltage (Vbat) is the voltage provided to the battery 152 at the Vbat terminal of the enabled one of the chargers 248 or 350 in in FIG. 3. In FIG. 4 and other FIGS., the following acronyms are sometimes used: SC for switched capacitor; CC for constant current; CV for constant voltage; and OVP for over voltage protection.

As can be appreciated from FIG. 4, the charging profile shown therein includes five charging phases, including a pre-charge phase (between times T0 and T1), a constant current buck phase (between times T1 and T2), a constant current switched capacitor phase (between times T2 and T3), a constant voltage switched capacitor phase (between times T3 and T4), and a constant voltage buck phase (between times T4 and T5). The constant current buck phase (between times T1 and T2) can be referred to more generally as the constant current closed-loop charging phase; the constant current switched capacitor phase (between times T2 and T3) can be referred to more generally as the constant current open-loop charging phase; the constant voltage switched capacitor phase (between times T3 and T4) can be referred to more generally as the constant voltage open-loop charging phase; and the constant voltage buck phase (between times T4 and T5) can be referred to more generally as the constant voltage closed-loop charging phase. The waveform labeled 402 shows an example of how the output voltage (Vout) of the wireless power RXIC 246 in FIG. 3 changes from one phase to the next; the waveform labeled 404 shows how an example of how the battery charging voltage (Vbat) changes from one phase to the next; and the waveform labeled 406 shows how an example of how the battery charging current (Ichg) changes from one phase to the next.

The waveform labeled 402 shows that the output voltage (Vout) remains constant (e.g., at 5V) during the pre-charge phase (between times T0 and T1) and during the constant current buck phase (between times T1 and T2). The output voltage (Vout) is shown as increasing from 5V to about 7.2V at time T2, and then gradually stepping up from 7.2V to about 8.4V during the constant current switched capacitor phase (between times T2 and T3). The output voltage (Vout) then stays at about 8.4V for a portion of the constant voltage switched capacitor phase (between times T3 and T4), and gradually drops to about 8.2V for a remaining portion of the constant voltage switched capacitor phase. The output voltage (Vout) is shown as decreasing from 8.2V back to 5V at time T4 and remaining at 5V during the constant voltage buck phase (between times T4 and T5). The values of the output voltage (Vout) during the charging process heavily depends on the specific design of the battery power system as well as the charging current, and thus, the above values are just intended to be examples in a typical system.

Still referring to FIG. 4, the waveform labeled 404 shows that the battery charging voltage (Vbat) steadily increases at a first rate from about 3V to about 3.5V during the pre-charge phase (between times T0 and T1) and during the constant current buck phase (between times T1 and T2). The battery charging voltage (Vbat) is shown as steadily increasing at a second rate (that is greater than the first rate) from about 3.5V to about 4.2V during the constant current switched capacitor phase (between times T2 and T3). The battery charging voltage (Vbat), during the constant voltage switched capacitor phase (between times T3 and T4), very slowly increases to a battery over voltage protection (OVP) level, then is reduced slightly and then again slowly increases to the battery OVP level. The battery charging voltage (Vbat) is shown as remaining constant (just below the battery OVP level) during the constant voltage buck phase (between times T4 and T5).

The waveform labeled 406 shows that the battery charging current (Ichg) stays constant at about 0.2 Amps(A) during the pre-charge phase (between times T0 and T1). At time T1 the battery current (Ichg) jumps up to about 1 A and stays constant at about 1 A during the constant current buck phase (between times T1 and T2). The battery charging current (Ichg) is shown as varying between about 4 A and 3.7 A in a sawtooth manner during the constant current switched capacitor phase (between times T2 and T3). The battery charging current (Ichg), during the constant voltage switched capacitor phase (between times T3 and T4), decreases from about 4 A to about 2 A in a parabolic manner, with a brief decrease corresponding to when the battery charging voltage (Vbat) reached the OVP level. The battery charging current (Ichg) is shown as decreasing from about 2 A to the termination current close to 0 A in a parabolic manner during the constant voltage buck phase (between times T4 and T5).

Figure 5:
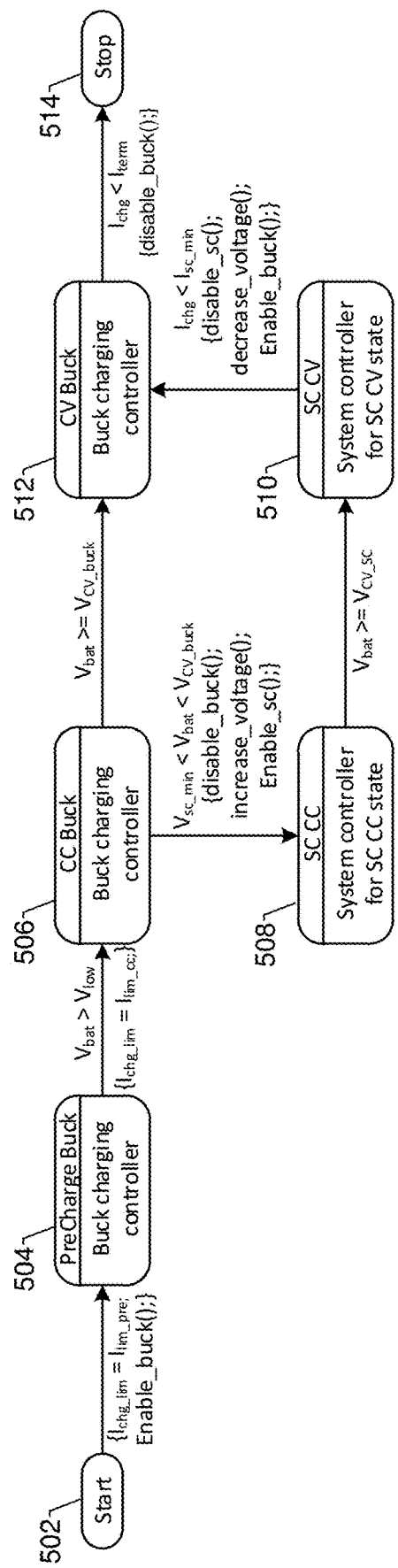
FIG. 5 is a state diagram that is used to explain how the wireless battery charging system shown in FIG. 3 operates in accordance with certain embodiments of the present technology.

FIG. 5 is a state diagram that is used to explain how the wireless battery charging system shown in FIG. 3 operates in accordance with certain embodiments of the present technology. Referring to FIG. 5, following start 502 a battery charging current limit (Ichg_lim) is set equal to a pre-charge current limit (Ilim_pre), and the buck converter (248 in FIG. 3) is enabled. State 504 corresponds to the pre-charge phase, during which the buck charger 248 perform pre-charging and the battery charging current limit (Ichg_lim) is set equal to a constant current limit (Ilim_cc). The pre-charging using the buck charger 248 continues until the battery charging voltage (Vbat) exceeds a first voltage threshold (Vlow), which can also be referred to as a pre-charge voltage threshold. State 506 corresponds to the constant current buck phase, during which the battery charging current (Ichg) is kept constant, and the battery charging voltage (Vbat) is gradually increased. When the battery charging voltage (Vbat) exceeds a second voltage threshold (Vsc_min), but is below a third voltage threshold (Vcv_buck), then the buck charger 248 is disabled, the switched capacitor charger 350 is enabled, and state 508 occurs. State 508 corresponds to the switched capacitor constant current phase, during which the switched capacitor charger 350 is used to charge the battery 152 while maintaining the battery charging current (Ichg) generally constant until the battery charging voltage (Vbat) reaches a further voltage threshold (Vcv_cc), at which point there is a transition to state 510. State 510 corresponds to the constant voltage switch capacitor state, during which the switched capacitor charger 350 is used to charge the battery while maintaining the battery charging voltage (Vbat) generally constant until the battery charging current (Ichg) falls below a first current threshold (Isc_min), at which point the switched capacitor charger 350 is disabled, the buck charger 248 is enabled, and there is a transition to state 512. As shown in FIG. 5, it is also possible that there can be a jump to state 512 directly from state 506, if the battery charging voltage (Vbat) exceeds the third voltage threshold (Vcv_buck). This may happen, e.g., if a battery starting to be charged is already close to being fully charged from the start.

State 512 corresponds to the constant voltage buck phase, during which the buck charger 248 is used to charge the battery while maintaining the battery charging voltage (Vbat) generally constant until the battery charging current (Ichg) falls below a second current threshold (Iterm), at which point the buck charger 348 is disabled, and the charging stops at state 514, because the battery is fully charged.

In the above description Ilim is a pre current limit setting for pre-charge, an exemplary value is 120 mA. Ilim_cc is current limit setting for CC buck charging, an exemplary value is 1 A-2 A. Iterm is the termination current setting, an exemplary value is 10 mA. Vcv_sc is the minimum voltage to enter CV SC, an exemplary value is 4.1V. Vcv_buck is the minimum voltage to enter CV buck, an exemplary value is 4.2V.

Figure 6:
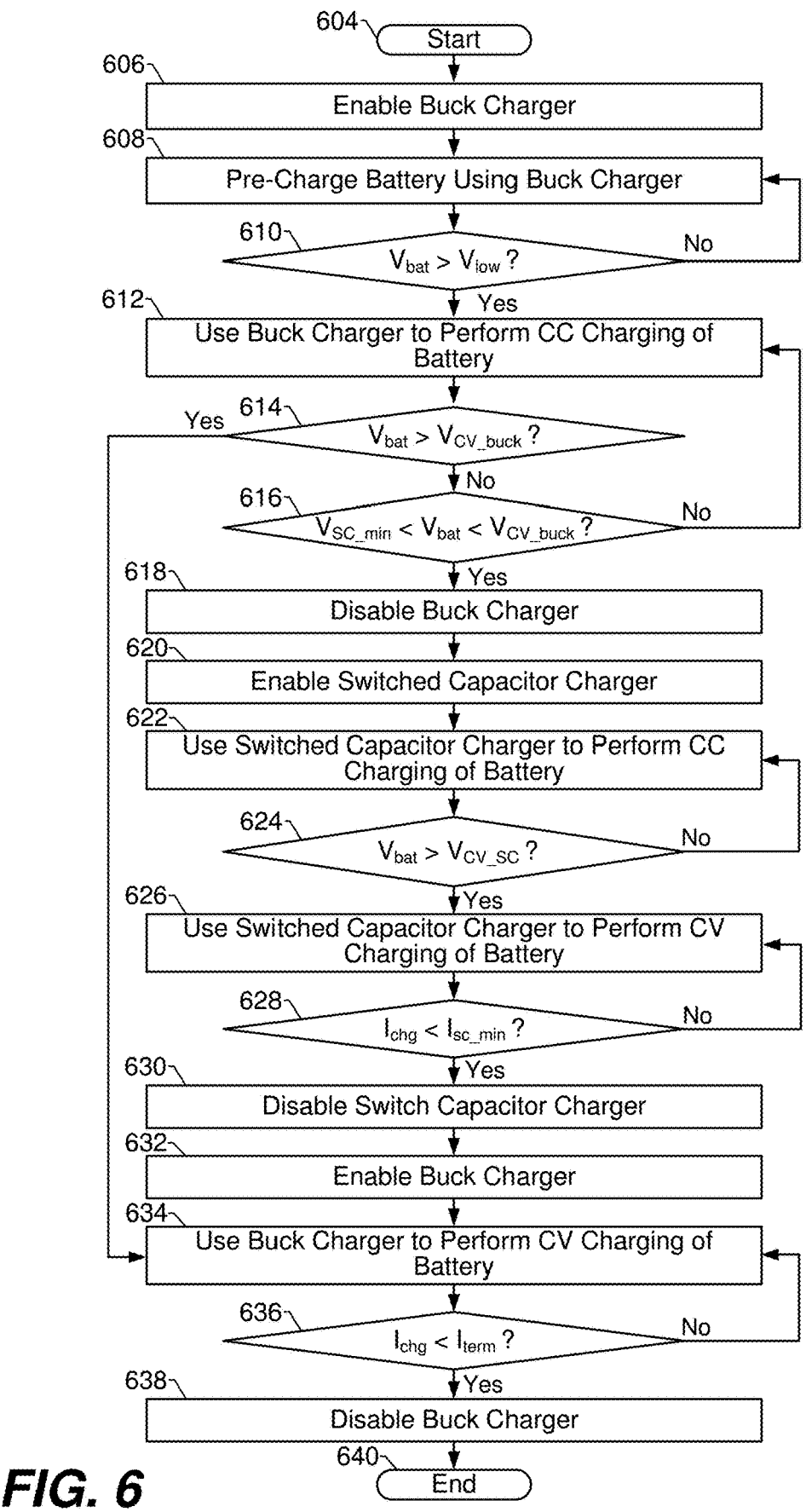
FIG. 6 is a high level flow diagram that is used to summarize certain methods for use with the wireless battery charging system shown in FIG. 3.

FIG. 6 is a high level flow diagram that is used to summarize certain methods for use with the wireless battery charging system shown in FIG. 3. More specifically, the flow diagram of FIG. 6 is a different way of representing what is already shown in the state diagram of FIG. 5.

After the method is started at step 604, at step 606 the buck converter (248 in FIG. 3) is enabled. At about the same time a battery charging current limit (Ichg_lim) can be set equal to a pre-charge current limit (Ilim_pre).

At step 608 the buck charger 248 performs pre-charging of the battery. Additionally, at about the same time the battery charging current limit (Ichg_lim) can be set equal to be equal a constant current limit (Ilim_cc).

At step 610 there is a determination of whether the battery charging voltage (Vbat) exceeds a first voltage threshold (Vlow), which can also be referred to as a pre-charge voltage threshold. If the answer to step 610 is No, the flow returns to step 608. If the answer to step 610 is Yes, then flow goes to step 612.

At step 612 the buck charger (248 in FIG. 3) is used to perform constant current charging of the battery, during which the battery charging current (Ichg) is kept constant, and the battery charging voltage (Vbat) is gradually increased.

At step 614 there is a determination of whether the battery charging voltage (Vbat) exceeds a third voltage threshold (Vcv_buck). If the answer to the determination at step 614 is No, then flow goes to step 616. If the answer to the determination at step 614 is Yes, then flow jumps to step 634, which is discussed below.

At step 616 there is a determination of whether the battery charging voltage (Vbat) is between a second voltage threshold (Vsc_min) and the third voltage threshold (Vcv_buck). If the answer to the determination at step 616 is No, then flow goes back to step 612. If the answer to the determination at step 616 is Yes, then flow goes to step 618.

At step 618 the buck charger 248 is disabled, and at step 620 the switch capacitor charger (350 in FIG. 3) is enabled. At step 622 the switched capacitor charger 350 is used to charge the battery while maintaining the battery charging current (Ichg) generally constant. At step 624 there is a determination of whether the battery charging voltage (Vbat) reached a further voltage threshold (Vcv_sc). If the answer to the determination at step 624 is No, then flow returns to step 622. If the answer to the determination at step 624 is Yes, then flow goes to step 626.

At step 626 the switched capacitor charger 350 is used to charge the battery while maintaining the battery charging voltage (Vbat) generally constant.

At step 628 there is a determination of whether the battery charging current (Ichg) is below a first current threshold (Isc_min). If the answer to the determination at step 628 is No, then flow returns to step 626. If the answer to the determination at step 628 is Yes, then flow goes to step 630.

At step 630, the switched capacitor charger 350 is disabled. At step 632 the buck charger 248 is enabled. At step 634 the buck charger is used to charge the battery while maintaining the battery charging voltage (Vbat) generally constant.

At step 636 there is a determination of whether the battery charging current (Ichg) is less than a second current threshold (Iterm). If the answer to the determination at step 636 is No, then flow returns to step 634. If the answer to the determination at step 636 is Yes, then flow goes to step 638. At step 638 the buck charger is disabled, and the charging stops, as represented by step 640, because the battery is fully charged.

The steps described with reference to FIG. 6 can be performed by one or more controller, including, e.g., the PD controller 214, the PD controller 224, and/or the AP 244. In certain embodiments, the AP 244 can be used to perform, or at least oversee, a majority of the steps described with reference to FIG. 6. The PD controller 214 and/or the PD controller 224 can also help perform certain steps. Other variations are also possible.

Figure 7A:
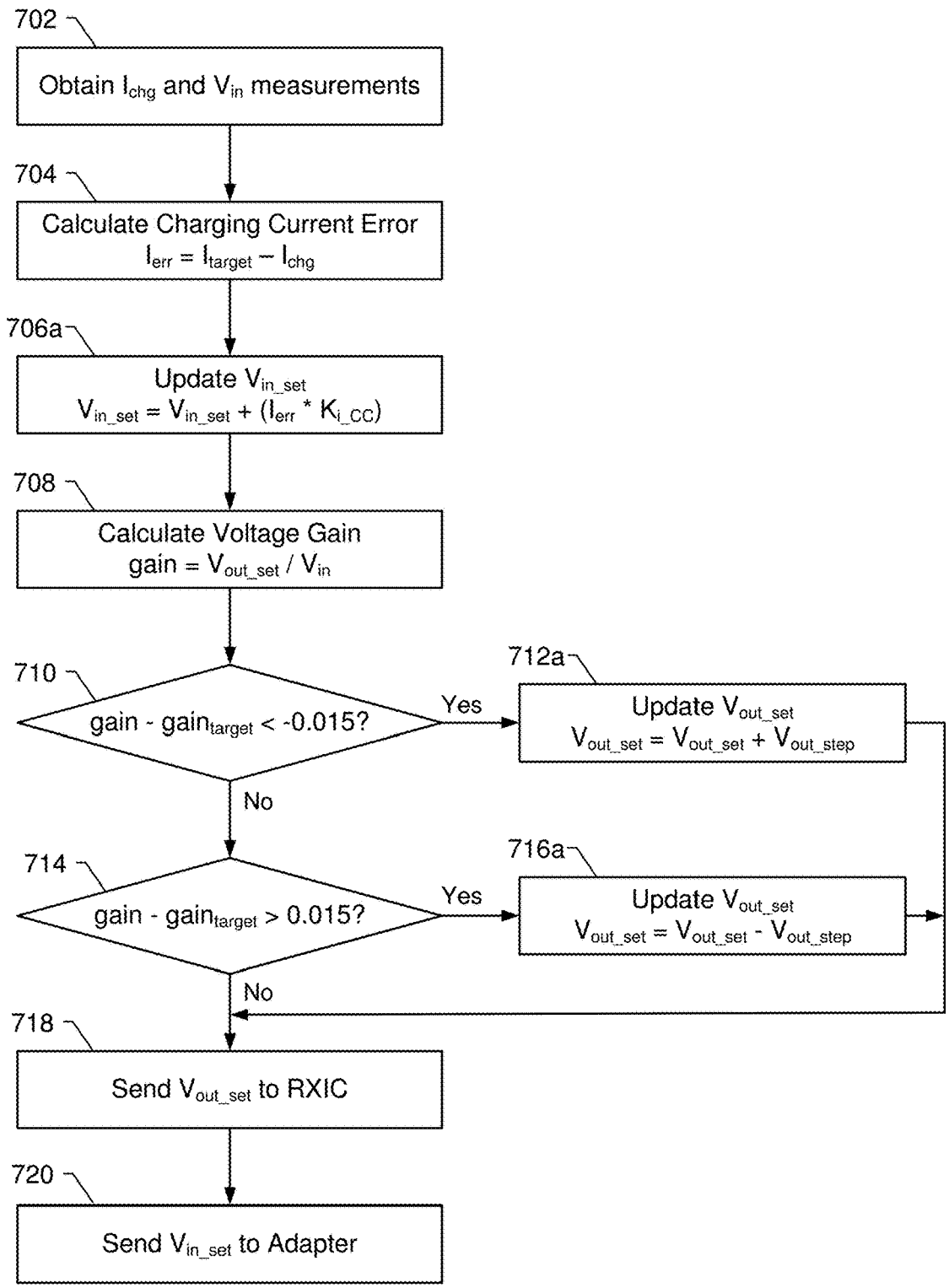
FIGS. 7A, 7B, and 7C are high level flow diagrams that are used to summarize how certain voltages are controlled during a constant current switched capacitor phase according to various different embodiments of the present technology.
Figure 7B:
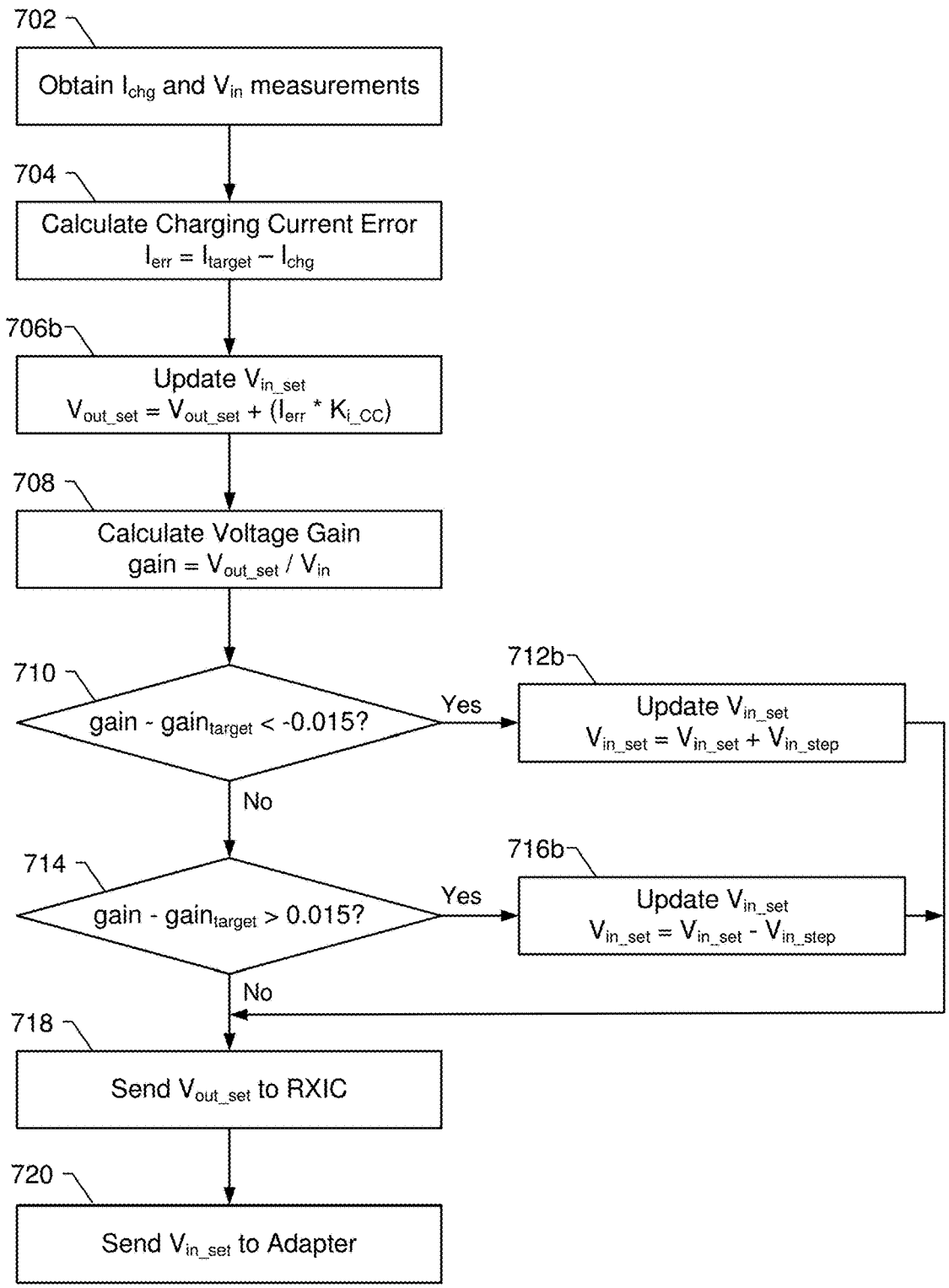
Figure 7C:
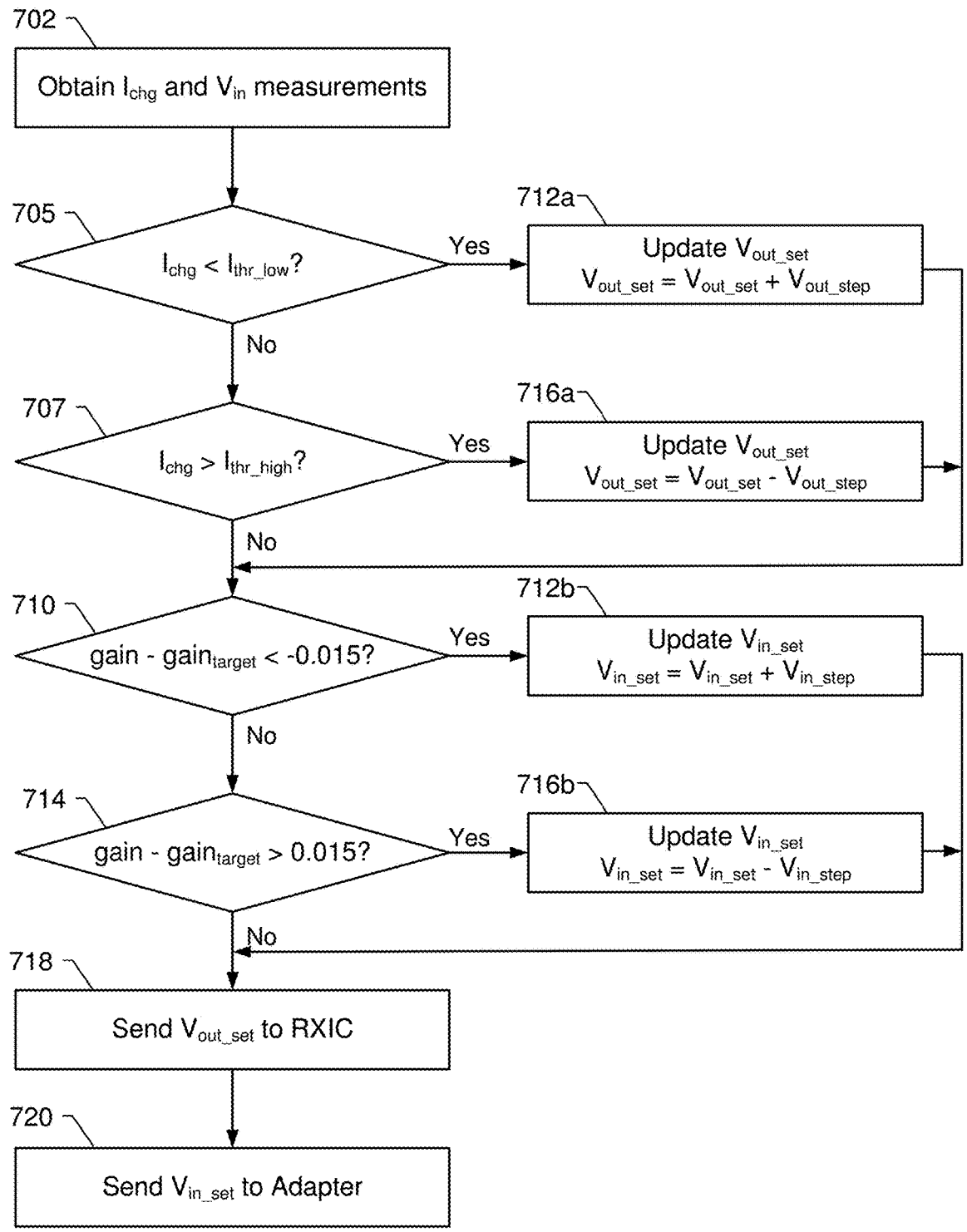

FIGS. 7A, 7B, and 7C are high level flow diagrams that are used to summarize how certain voltages are controlled during a constant current switched capacitor phase according to various different embodiments of the present technology. In other words, the flow diagrams in FIGS. 7A, 7B, and 7C are used to summarize different ways of implementing state 508 in FIG. 5, or different ways of implementing step 622 in FIG. 6.

Referring to FIG. 7A, step 702 involves obtaining battery charging current (Ichg) and input voltage (Vin) measurements. The PD controller 224 and/or the wireless power TXIC 226 of the wireless power TX 122 can obtain the input voltage (Vin) measurement. Alternatively, the PD controller 214 of the adaptor 112 can obtain the input voltage (Vin) measurement. The AP processor 224 can obtain the Ichg measurement throughout the charging process from the chargers (e.g., 248 and 250). Other variations are also possible.

Step 704 involves calculating a battery charging current error (Ierr) using the Equation: Ierr=I_target—Ichg, where I_target is a predetermined target current for use during the constant current switched capacitor phase. Step 704 can be performed, e.g., by the AP 244, the PD controller 224, or the PD controller 214, as such controllers can communicate to pass measurements and calculations among one another.

Step 706a involves updating an input voltage setting (Vin_set) using the Equation: Vin_set=Vin_set+(Ierr*Ki_CC), where Ki_CC is a predetermined constant, and Vin_set is a setting that is used to control the input voltage (Vin) provided to the wireless power TX 122.

Step 708 involves calculating a voltage gain of the wireless battery charging system using the Equation: gain=Vout_set/Vin, where Vout_set is a setting used to control the output voltage (Vout) produced by the wireless power RXIC 246, and Vin is the actual input voltage (Vin) produced by the adaptor.

At step 710 there is a determination of whether a difference between the actual gain (gain) and a target gain (gain_target) is less than a lower threshold (e.g., −0.015). If the answer to the determination at step 710 is Yes, then flow goes to step 712a and Vout_set is updated using the Equation: Vout_set=Vout_set+Vout_step, where Vout_step is a predetermined voltage step size. If the answer to the determination at step 710 is No, then flow goes to step 714. At step 714 there is a determination of whether a difference between the actual gain (gain) and the target gain (gain_target) is greater than an upper threshold (e.g., 0.015). If the answer to the determination at step 714 is Yes, then flow goes to step 716a and Vout_set is updated using the Equation: Vout_set=Vout_set−Vout_step, where Vout_step is a predetermined voltage step size, which can be the same as the Vout_step used at step 714a, or can be different. If the answer to the determination at step 714 is No, then flow goes to step 718. Flow can also go to step 718 after one of steps 712a or 716a is performed. At step 718 Vout_set is sent to the wireless power RXIC 246, wherein Vout_set may or may not have been updated, depending upon whether the actual system gain was within a threshold amount of the target gain. At step 720 Vin_set is sent to the adaptor 112.

The flow diagram of FIG. 7A summarizes a technique that can be used, during the constant current switch capacitor phase, to adjust the input voltage (Vin) provided to the wireless power TX 122 to cause a battery charging current (Ichg) to stay close to a target charging current (I_target), and to adjust the output voltage (Vout) produced by the wireless power RX to cause a voltage gain of the system to stay close to a target voltage gain (gain_target).

Referring now to FIG. 7B, steps 702 and 704 are the same as in FIG. 7A, and thus need not be described again. Step 706b involves updating the output voltage setting (Vout_set) using the Equation: Vout_set=Vout_set+(Ierr*Ki_CC), where Ki_CC is a predetermined constant, and Vout_set is a setting that is used to control the output voltage (Vout) produced by the wireless power RXIC 246.

Steps 708, 710, and 714 in FIG. 7B are the same as in FIG. 7A, and thus need not be described again. If the answer to the determination at step 710 is Yes, then flow goes to step 712b and Vin_set is updated using the Equation: Vin_set=Vin_set+Vin_step, where Vin_step is a predetermined voltage step size. If the answer to the determination at step 710 is No, then flow goes to step 714. If the answer to the determination at step 714 is Yes, then flow goes to step 716b and Vin_set is updated using the Equation: Vin_set=Vin_set−Vin_step, where Vin_step is a predetermined voltage step size, which can be the same as the Vin_step used at step 714b, or can be different. If the answer to the determination at step 714 is No, then flow goes to step 718. Flow can also go to step 718 following one of steps 712b or 716b. At step 718 Vout_set is sent to the wireless power RXIC 246. At step 720 Vin_set is sent to the adaptor 112, wherein Vin_set may or may not have been updated, depending upon whether the actual gain was within a threshold amount of the target gain.

The flow diagram of FIG. 7B summarizes a technique that can be used, during the constant current switch capacitor phase, to adjust the output voltage (Vout) produced by the wireless power RX to cause a battery charging current (Ichg) to stay close to a target charging current (I_target), and to adjust the input voltage (Vin) produced by the adaptor to 112 cause the voltage gain of the system to stay close to the target voltage gain.

Referring now to FIG. 7C, step 702 is the same as in FIG. 7A, and thus need not be described again. At step 705 there is a determination of whether the battery charging current (Ichg) is less than a low current threshold (Ithr_low). If the answer to the determination at step 705 is Yes, then flow goes to step 712a, which is the same as step 712a in FIG. 7A and thus need to be described again. If the answer to the determination at step 705 is No, then flow goes to step 707. At step 707 there is a determination of whether the battery charging current (Ichg) is greater than a high current threshold (Ithr_high). If the answer to the determination at step 707 is Yes, then flow goes to step 716a, which is the same as step 716a in FIG. 7A and thus need to be described again. If the answer to the determination at step 707 is No, then flow goes to step 710. Steps 710, 714, 712b and 716b in FIG. 7C are the same as the commonly numbered steps in FIGS. 7A and/or 7B described above, and thus need not be described again.

At step 718 Vout_set is sent to the wireless power RXIC 246, wherein Vout_set may or may not have been updated, depending upon whether the battery charging current (Ichg) is within a threshold range. At step 720 Vin_set is sent to the adaptor 112, wherein Vin_set may or may not have been updated, depending upon whether the actual gain was within a threshold amount of the target gain.

The flow diagram of FIG. 7C summarizes another technique that can be used, during the constant current switch capacitor phase, to adjust the output voltage (Vout) produced by the wireless power RX to cause a battery charging current (Ichg) to stay close to a target charging current (I_target), and to adjust the input voltage (Vin) provided to the wireless power TX 122 to cause the voltage gain of the system to stay close to the target voltage gain.

In each of the embodiments described herein, the input voltage (Vin) provided to the wireless power TX 122 can be adjusted by the adaptor 112, if the adaptor 112 has such a capability. Alternatively, a further DC-DC converter can be located between the adaptor 112 and the wireless power TX 122, the adaptor 112 can output a constant DC voltage, and the further DC-DC converter can be controlled to adjust the input voltage (Vin) that is provided to the wireless power TX 122. Such controlling of the input voltage (Vin) can be performed, e.g., by the PD controller 214, the PD controller 224, the AP 244, or some other controller, depending upon the specific implementation. In embodiments where the adaptor 112 does not control the input voltage (Vin), the Vin_set at step 720 should instead be sent to which ever controller does control the input voltage (Vin). In certain embodiments, Vout_set is only sent at an instance of step 718 if it has been changed. In certain embodiments, Vin_set is only sent at an instance of step 720 if it has been changed.

In alternative embodiment, the Vin measurement obtained at step 702 could be simplified by estimating that Vin=Vin_set, in which cases, the gain could be estimated at step 708 using the equation gain=Vout_set/Vin_set.

In certain embodiments, the operating frequency could alternatively or additionally be used as a control target (e.g., in steps 710 and 714), where the operating frequency could be obtained through measurements by the TXIC or RXIC (e.g., as part of step 702). At step 710 and 714, or additional steps, the measured operating frequency could be compared to an operating frequency target f_target, to determine whether the operation frequency is within a threshold range of the target, with results of the comparisons being used to update Vin_set and/or Vout set (e.g., at steps 712a,b and/or 716a,b, or additional steps).

In still other embodiments, during the constant current switch capacitor phase, the output voltage (Vout) produced by the wireless power RX is adjusted to cause a battery charging current to stay close to a target charging current, while the input voltage (Vin) provided to the wireless power TX is fixed.

Figure 8A:
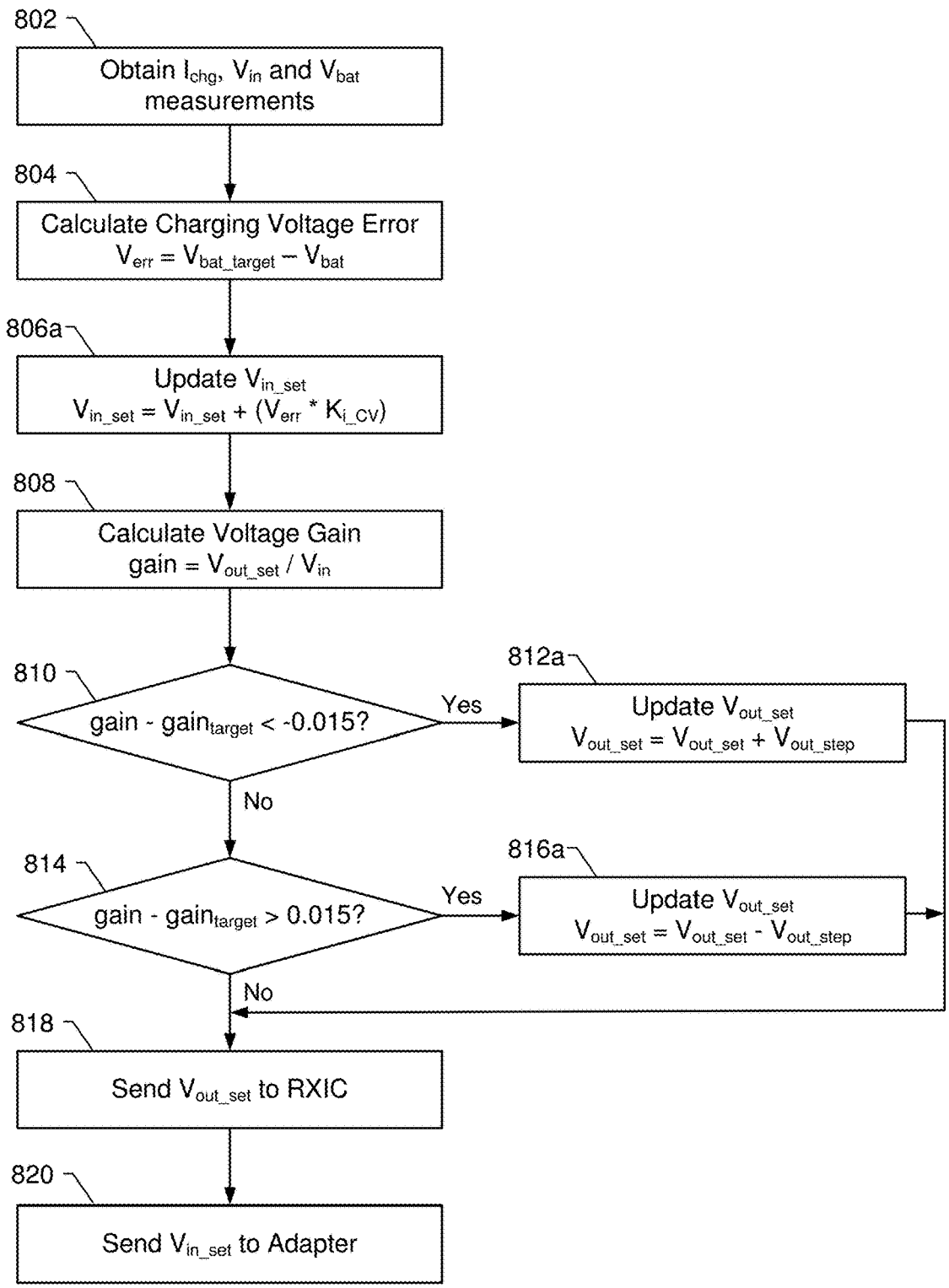
FIGS. 8A and 8B are high level flow diagrams that are used to summarize how certain voltages are controlled during a constant voltage switched capacitor phase according to various different embodiments of the present technology.
Figure 8B:
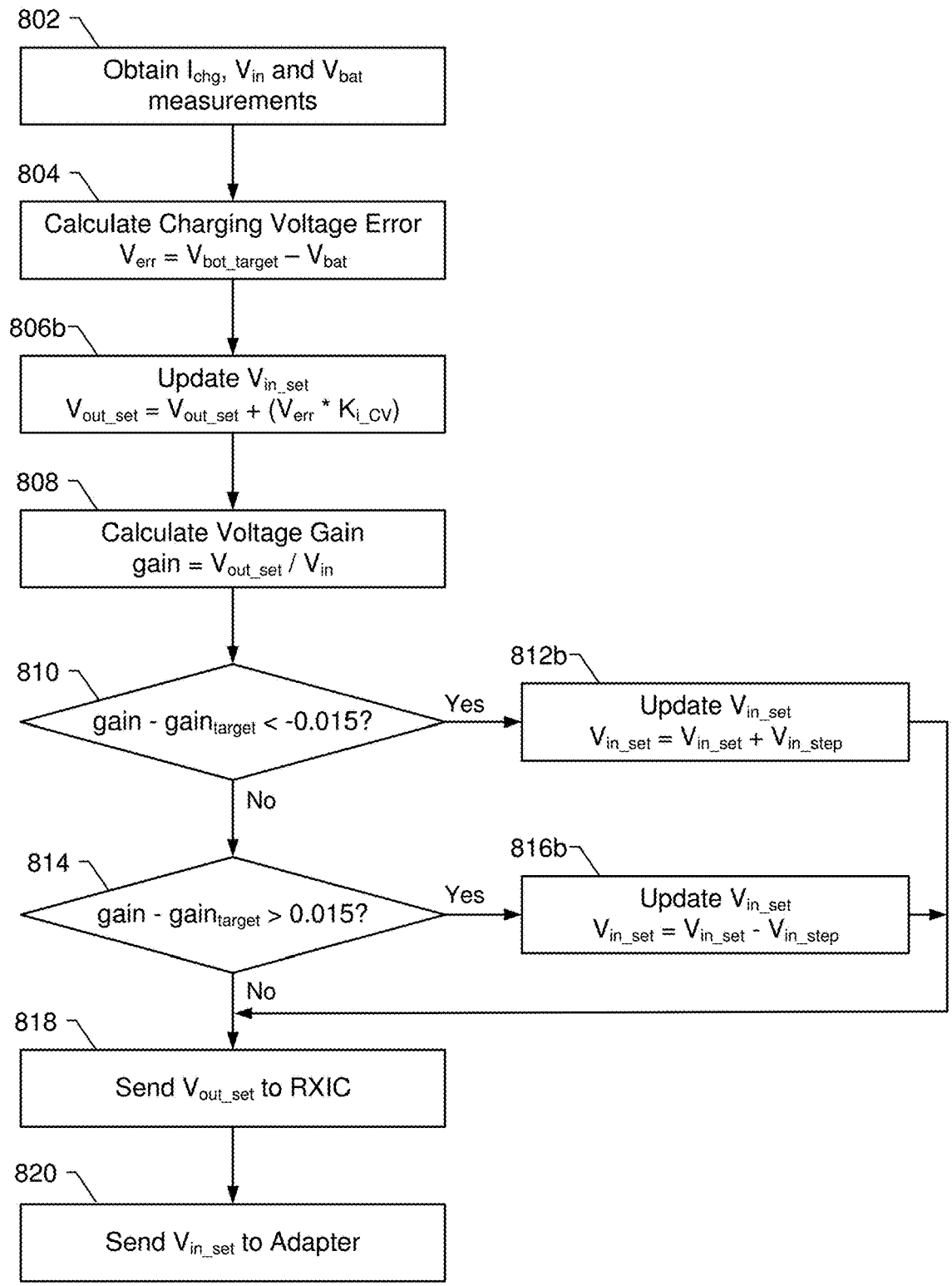

FIGS. 8A and 8B are high level flow diagrams that are used to summarize how certain voltages are controlled during a constant voltage switched capacitor phase according to various different embodiments of the present technology. In other words, the flow diagrams in FIGS. 8A and 8B are used to summarize different ways of implementing state 510 in FIG. 5, or different ways of implementing step 626 in FIG. 6.

Referring to FIG. 8A, step 802 involves obtaining battery charging current (Ichg), input voltage (Vin), and battery charging voltage (Vbat) measurements. The PD controller 224 and/or the wireless power TXIC 226 of the wireless power TX 122 can obtain the input voltage (Vin) measurement. Alternatively, the PD controller 214 of the adaptor 112 can obtain the input voltage (Vin) measurement. The AP 244 can obtain the Ichg and Vbat measurements throughout the charging process from the chargers (e.g., 248 and 350). Other variations are also possible.

Step 804 involves calculating a battery charging voltage error (Verr) using the Equation: Verr=Vbat_target−Vbat, where Vbat_target is a predetermined target charging voltage for use during the constant voltage switched capacitor phase. Step 804 can be performed, e.g., by the AP 244, the PD controller 224, or the PD controller 214, as such controllers can communicate to pass measurements and calculations among one another. Other variations are also possible.

Step 806a involves updating an input voltage setting (Vin_set) using the Equation: Vin_set=Vin_set+ (Verr*Ki_cc), where Ki_cv is a predetermined constant, and Vin_set is a setting that is used to control the input voltage (Vin) provided to the wireless power TX 122.

Step 808 involves calculating a voltage gain using the Equation: gain=Vout_set/Vin, where Vout_set is a setting used to control the output voltage (Vout) produced by the wireless power RXIC 246, and Vin is the actual input voltage (Vin) produced by the adaptor.

At step 810 there is a determination of whether a difference between the actual gain (gain) and a target gain (gain_target) is less than a lower threshold (e.g., −0.015). If the answer to the determination at step 810 is Yes, then flow goes to step 812a and Vout_set is updated using the Equation: Vout_set=Vout_set+Vout_step, where Vout_step is a predetermined voltage step size. If the answer to the determination at step 810 is No, then flow goes to step 814. At step 814 there is a determination of whether a difference between the actual gain (gain) and the target gain (gain_target) is greater than an upper threshold (e.g., 0.015). If the answer to the determination at step 814 is Yes, then flow goes to step 816a and Vout_set is updated using the Equation: Vout_set=Vout_set−Vout_step, where Vout_step is a predetermined voltage step size, which can be the same as the Vout_step used at step 814a, or can be different. If the answer to the determination at step 814 is No, then flow goes to step 818. Flow can also go to step 818 after one of step 812a or 816a is performed. At step 818 Vout_set is sent to the wireless power RXIC 246, wherein Vout_set may or may not have been updated, depending upon whether the actual gain was within a threshold amount of the target gain. At step 820 Vin_set is sent to the adaptor 112.

The flow diagram of FIG. 8A summarizes a technique that can be used, during the constant voltage switch capacitor phase, to adjust the input voltage (Vin) provided to the wireless power TX 122 to cause a battery charging voltage (Vbat) to stay close to a target charging voltage (Vbat_target), and to adjust the output voltage (Vout) produced by the wireless power RX to cause a voltage gain of the system to stay close to a target voltage gain (gain_target).

Referring now to FIG. 8B, steps 802 and 804 are the same as in FIG. 8A, and thus need not be described again. Step 806b involves updating the output voltage setting (Vout_set) using the Equation: Vout_set=Vout_set+(Ierr*Ki_cc), where Ki_cc is a predetermined constant, and Vout_set is a setting that is used to control the output voltage (Vout) produced by the wireless power RXIC 246.

Steps 808, 810, and 814 in FIG. 8B are the same as in FIG. 8A, and thus need not be described again. If the answer to the determination at step 810 is Yes, then flow goes to step 812b and Vin_set is updated using the Equation: Vin_set=Vin_set+Vin_step, where Vin_step is a predetermined voltage step size. If the answer to the determination at step 810 is No, then flow goes to step 814. If the answer to the determination at step 814 is Yes, then flow goes to step 816b and Vin_set is updated using the Equation: Vin_set=Vin_set−Vin_step, where Vin_step is a predetermined voltage step size, which can be the same as the Vin_step used at step 814b, or can be different. If the answer to the determination at step 814 is No, then flow goes to step 818. Flow can also go to step 818 following one of steps 812b or 816b. At step 818 Vout_set is sent to the wireless power RXIC 246. At step 820 Vin_set is sent to the adaptor 112, wherein Vin_set may or may not have been updated, depending upon whether the actual gain was within a threshold amount of the target gain.

The flow diagram of FIG. 8B summarizes a technique that can be used, during the constant voltage switch capacitor phase, to adjust the output voltage (Vout) produced by the wireless power RX to cause a battery charging voltage (Vbat) to stay close to a target charging voltage (Vbat_target), and to adjust the input voltage (Vin) provided to the wireless power TX 122 to cause the voltage gain of the system to stay close to the target voltage gain.

In each of the embodiments described herein, the input voltage (Vin) provided to the wireless power TX 122 can be adjusted by the adaptor 112, if the adaptor 112 has such a capability. Alternatively, a further DC-DC converter can be located between the adaptor 112 and the wireless power TX 122, the adaptor 112 can output a constant DC voltage, and the further DC-DC converter can be controlled to adjust the input voltage (Vin) that is provided to the wireless power TX 122. Such controlling of the input voltage (Vin) can be performed, e.g., by the PD controller 214, the PD controller 224, the AP 244, or some other controller, depending upon the specific implementation. In embodiments where the adaptor 112 does not control the input voltage (Vin), the Vin_set at step 820 should instead be sent to which ever controller does control the input voltage (Vin). In certain embodiments, Vout_set is only sent at an instance of step 818 if it has been changed. In certain embodiments, Vin_set is only sent at an instance of step 820 if it has been changed.

In alternative embodiments, during the constant voltage switch capacitor phase, the output voltage (Vout) produced by the wireless power RX is adjusted to cause the battery charging voltage to stay close to a target voltage, while the input voltage (Vin) provided to the wireless power TX is fixed.

In certain embodiments, the operating frequency could alternatively or additionally be used as a control target (e.g., in steps 810 and 814), where the operating frequency could be obtained through measurements by the TXIC or RXIC (e.g., as part of step 802). At step 810 and 814, or additional steps, the measured operating frequency could be compared to an operating frequency target f_target, to determine whether the operation frequency is within a threshold range of the target, with results of the comparisons being used to update Vin_set and/or Vout_set (e.g., at steps 812a,b and/or 816a,b, or additional steps).

In-band communications specified by the Qi standard can be used to perform communication among the various controllers described above. Alternatively, or additionally, out-of-band communication can be performed, e.g., using Bluetooth, WIFI, near field communication (NFC), etc.

In many of the embodiments described above, a buck charger was described as typically being used for closed-loop charging, and a switched capacitor charger was described as typically being used for open-loop charging. It would also be possible to use other types of closed-loop DC-DC converters in place of the buck charger for closed-loop charging, such as a boost charger, a buck-boost charger etc. but not limited thereto. It would also be possible to use other types of open-loop DC-DC converters in place of the switched capacitor charger for open-loop charging, such as, a load switch charger, or a flash charging charger, but not limited thereto.

Figure 9:
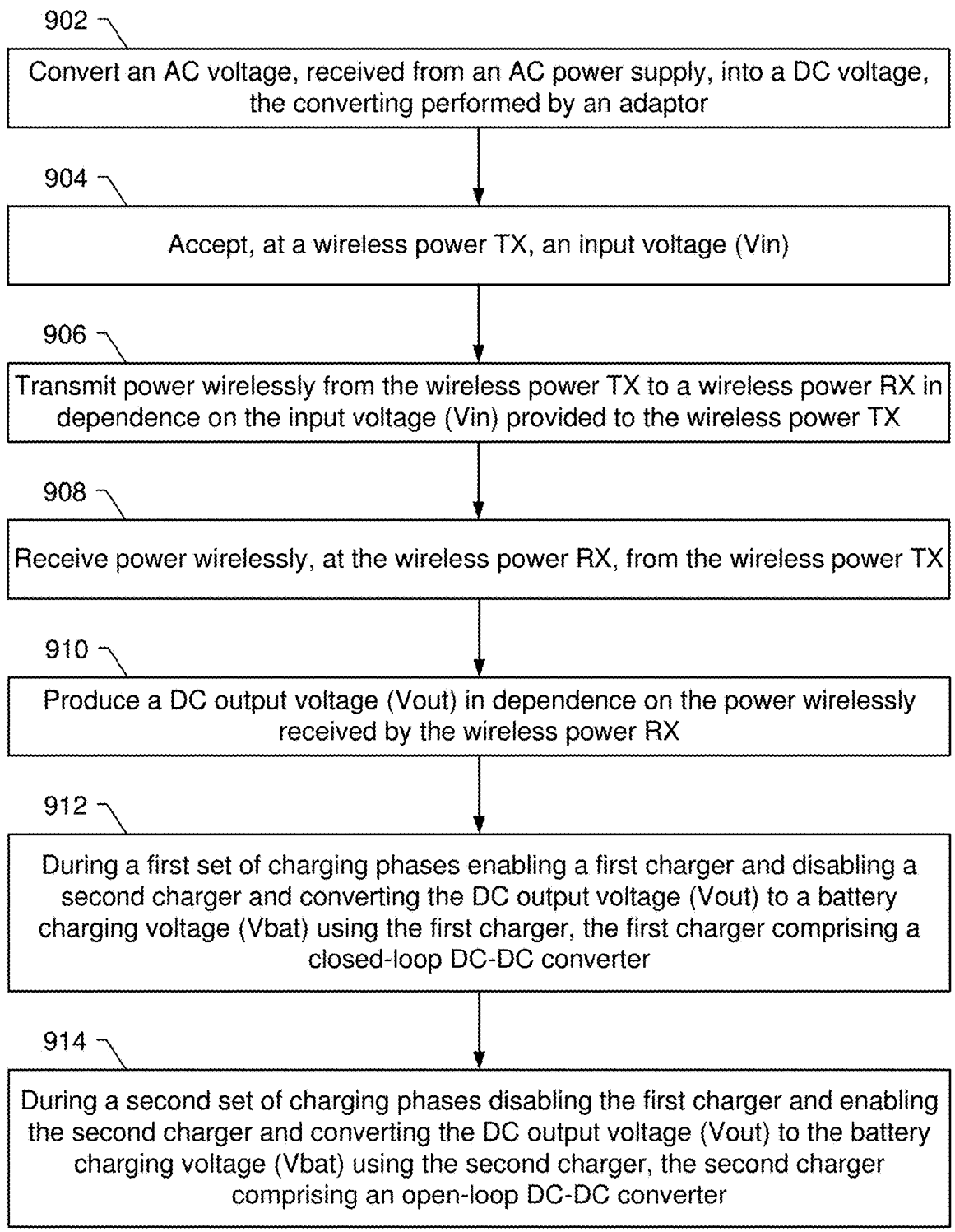
FIG. 9 is a high level flow diagram that is used to summarize methods according to various embodiments of the present technology.

FIG. 9 is a high level flow diagram that is used to summarize various methods described above for wirelessly charging a battery of an electronic device including a load powered by the battery. Referring to FIG. 9, step 902 involves converting an AC voltage, received from an AC power supply, into a DC voltage, the converting performed by an adaptor (e.g., 112 in FIG. 3). Step 904 involves accepting, at a wireless power transmitter (TX) (e.g., 122 in FIG. 3), an input voltage (Vin), wherein the input voltage (Vin) accepted by the wireless power TX is based on the DC voltage produced by the adaptor. More specifically, the input voltage (Vin) that is accepted by the wireless power TX can be the DC voltage produced by the adaptor, or alternatively, can be produced by a further DC-DC converter (located between the adaptor and the wireless power TX) that receives the DC voltage produced by the adaptor generates Vin at its output. In other words, the input voltage (Vin) accepted by the wireless power TX being based on the DC voltage produced by the adaptor can mean that the input voltage (Vin) accepted by the wireless power TX is simply the DC voltage produced by the adaptor, or alternatively, can mean that the input voltage (Vin) accepted by the wireless power TX is produced by a further DC-DC converter that is between the adaptor and the wireless power TX (wherein the further DC-DC converter receives the DC voltage produced by the adaptor and generates the input voltage (Vin) provided to the wireless power TX). Step 906 involves transmitting power wirelessly from the wireless power TX to a wireless power receiver (RX) (e.g., 246 in FIG. 3), the transmitting performed in dependence on the input voltage (Vin) provided to the wireless power TX. Step 908 involves receiving power wirelessly, at the wireless power RX, from the wireless power TX. Step 910 involves producing a DC output voltage (Vout) in dependence on the power wirelessly received by the wireless power RX. Step 910 can be performed by the wireless power RXIC 246 in FIG. 3. Step 912 involves during a first set of charging phases enabling a first charger and disabling a second charger and converting the DC output voltage (Vout) to a battery charging voltage (Vbat) using the first charger, the first charger comprising a closed-loop DC-DC converter. Step 914 involves during a second set of charging phases disabling the first charger and enabling the second charger and converting the DC output voltage (Vout) to the battery charging voltage (Vbat) using the second charger, the second charger comprising an open-loop DC-DC converter. While steps 912 and 914 are shown one after the other in FIG. 9, in an actual implantation phases of the first and second sets of charging phases can be interleaved with one another, as can be understood from the above description.

In specific embodiments, the closed-loop DC-DC converter of the first charger comprises a buck charger, and the open-loop DC-DC converter of the second charger comprises a switched capacitor charger, a load switch charger, or a flash charging charger. In certain embodiments, the open-loop DC-DC converter of the second charger comprises a switched capacitor charger, and the charging phases include a pre-charge phase, a constant current buck phase, a constant current switched capacitor phase, a constant voltage switched capacitor phase, and a constant voltage buck phase.

In accordance with certain embodiments, the first charger is enabled and the second charger is disable during the pre-charge phase, the constant current buck phase, and the constant voltage buck phase; and the second charger is enabled and the first charger is disable during the constant current switched capacitor phase and the constant voltage switched capacitor phase. In accordance with certain embodiments, the pre-charge phase corresponds to when a battery charging voltage (Vbat) is below a first voltage threshold (Vlow); the constant current buck phase corresponds to when the battery charging voltage (Vbat) is between the first voltage threshold (Vlow) and a second voltage threshold (Vsc_min), the constant current switched capacitor phase corresponds to when the battery charging voltage (Vbat) is between the second voltage threshold (Vsc_min) and a third voltage threshold (Vcv_buck), the constant voltage switched capacitor phase corresponds to when the battery charging voltage (Vbat) is greater than a fourth voltage threshold (Vcv_sc), and the constant voltage buck phase corresponds to when the battery charging voltage (Vbat) is greater than the third voltage threshold (Vcv_buck) or the battery charging current (Ichg) is less than a current threshold (Isc_min).

In accordance with certain embodiments, during the constant current switch capacitor phase, the input voltage (Vin) provided to the wireless power TX is adjusted to cause a battery charging current (Ichg) to stay close to a target charging current, and adjusting the output voltage (Vout) produced by the wireless power RX to cause a voltage gain to stay close to a target voltage gain, wherein the voltage gain is ratio of the output voltage (Vout) to the input voltage (Vin). Alternatively, during the constant current switch capacitor phase, the output voltage (Vout) produced by the wireless power RX is adjusted to cause a battery charging current (Ichg) to stay close to a target charging current, and adjusting the input voltage (Vin) provided to the wireless power TX to cause a voltage gain to stay close to a target voltage gain, wherein the voltage gain is a ratio of the output voltage (Vout) to the input voltage (Vin). Alternatively, during the constant current switch capacitor phase, the input voltage (Vin) provided to the wireless power TX is adjusted to cause a battery charging current (Ichg) to stay close to a target charging current, and the output voltage (Vout) produced by the wireless power RX is adjusted to cause an operating frequency to stay close to a target operating frequency. Alternatively, during the constant current switch capacitor phase, the output voltage (Vout) produced by the wireless power RX is adjusted to cause a battery charging current (Ichg) to stay close to a target charging current, and the input voltage (Vin) provided to the wireless power TX is adjusted to cause an operating frequency to stay close to a target operating frequency. In still other embodiments, during the constant current switch capacitor phase, the output voltage (Vout) produced by the wireless power RX is adjusted to cause a battery charging current to stay close to a target charging current, while the input voltage (Vin) provided to the wireless power TX is fixed.

In accordance with certain embodiments, during the constant voltage switch capacitor phase, the input voltage (Vin) provided to the wireless power TX to cause the battery charging voltage (Vbat) is adjusted to stay close to a target voltage, and adjusting the output voltage (Vout) produced by the wireless power RX to cause a voltage gain to stay close to a target voltage gain, wherein the voltage gain is a ratio of the output voltage (Vout) to the input voltage (Vin). Alternatively, during the constant voltage switch capacitor phase, the output voltage (Vout) produced by the wireless power RX is adjusted to cause the battery charging voltage to stay close to a target voltage, and adjusting the input voltage (Vin) provided to the wireless power TX to cause a voltage gain to stay close to a target voltage gain, wherein the voltage gain is a ratio of the output voltage (Vout) to the input voltage (Vin). Alternatively, during the constant voltage switch capacitor phase, the input voltage (Vin) provided to the wireless power TX is adjusted to cause a battery charging voltage (Vbat) to stay close to a target voltage, and the output voltage (Vout) produced by the wireless power RX is adjusted to cause an operating frequency to stay close to a target operating frequency. Alternatively, during the constant voltage switch capacitor phase, the output voltage (Vout) produced by the wireless power RX is adjusted to cause a battery charging voltage (Vbat) to stay close to a target voltage, and the input voltage (Vin) provided to the wireless power TX is adjusted to cause an operating frequency to stay close to a target operating frequency. In still other embodiments, during the constant voltage switch capacitor phase, the output voltage (Vout) produced by the wireless power RX is adjusted to cause the battery charging voltage to stay close to a target voltage, while the input voltage (Vin) provided to the wireless power TX is fixed.

Further details of the methods summarized with reference to FIG. 9 can be appreciated from the above discussion of FIGS. 1-8B.

A closed-loop charger, such as a buck charger (e.g., 248), usually has an internal control that meets the control requirements for the pre-charge, constant current buck, and constant voltage buck phases. However, since a switched capacitor charger (e.g., 350) (or other type of open-loop charger) itself operates in open-loop, a system level controller (e.g., 244) can be used for controlling constant-current charging during the constant current switched capacitor phase and for controlling constant-voltage charging during the constant voltage switched capacitor phase.

Conventionally, a wireless battery charging system employs output voltage control between the TXIC and RXIC through adjusting the operating frequency, duty cycle, etc. The main purpose of this control is to ensure a proper output voltage (Vout) while the coupling condition between the TX and RX changes (such as relative offset/movement) or the output loading condition changes. For an open loop charger, such as a 2:1 switched capacitor charger, embodiments described herein introduce a system level control mechanism, e.g., through an application processor (AP), to ensure that the existing closed loop control between the TX and RX is still adequate in supporting different coupling and loading conditions while providing output current/voltage regulation. In certain methods described herein there are two control variables: Vin and Vout, which can be used to realize two objectives. One objective is to regulate the charging current (for the CC SC state) or charging voltage (for the CV SC state). The other objective is to control the gain (Vout/Vin) or the operating frequency to be close to a specific value that supports the variation in coupling and loading conditions. The control of Vout and Vin can be done via the communications within the charger, between the wireless power RX and wireless power TX, and between the wireless power TX and the adapter. In certain embodiments two control loops are used, including: a wireless power transfer loop to quickly stabilize its output voltage, Vout; and a system control loop that slowly adjusts Vin, and the wireless power transfer output voltage, Vout to ensure CC or CV charging as well as system stability, efficiency and spatial freedom.

When the open-loop charger operates, the system level controller controls the overall wireless battery charging system to operate in a closed-loop mode. In a constant current charging state, the system controller regulates the charging current to follow a target value. In a constant voltage charging state, the system controller regulates the battery charging voltage to follow a target value. In certain embodiments, the regulation is done by changing the output voltage (Vout), by sending a command to the RXIC to change its output reference. The system level controller can further regulate the gain (Vout/Vin) or the operating frequency to follow a target value by sending commands to the adapter (or a further DC-DC converter) to change the input voltage (Vin), e.g., by sending a command to the adapter to change its output reference. The system level controller can further regulate the gain (Vout/Vin) to follow a target value by sending commands to the RXIC to change its output voltage (Vout). This enables high efficient open-loop chargers such as switch capacitor chargers to be used in a wireless charging system. The system level controller can be, e.g., the AP 244, but is not limited thereto.

Certain embodiments of the present technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does not include propagated, modulated, or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wireless battery charging system for wirelessly charging a battery of an electronic device, the system comprising:
    an adaptor configured to convert an alternating current (AC) voltage, received from an AC power supply, into a direct current (DC) voltage;
    a wireless power transmitter (TX) configured to accept an input voltage (Vin) and in dependence thereon transmit power wirelessly to a wireless power receiver (RX), wherein the input voltage (Vin) accepted by the wireless power TX is based on the DC voltage produced by the adaptor;
    the wireless power RX configured to receive power wirelessly from the wireless power TX and in dependence thereon produce a DC output voltage (Vout);
    first and second chargers each including a voltage input terminal and a voltage output terminal, the voltage input terminal of each of the first and second chargers accepting the output voltage (Vout) from the wireless power RX, and the voltage output terminal of each of the first and second chargers configured to be coupled to a terminal of the battery that is to be charged;
    the first charger comprising a closed-loop DC-DC converter;
    the second charger comprising an open-loop DC-DC converter; and
    a controller configured to selectively enable one of the first or second chargers at a time so that during a first set of charging phases the first charger is used to charge the battery, and during a second set of the charging phases the second charger is used to charge the battery.

2. The system of claim 1, wherein:
    the closed-loop DC-DC converter of the first charger comprises a buck charger; and
    the open-loop DC-DC converter of the second charger comprises a switched capacitor charger, a load switch charger, or a flash charging charger.

3. The system of claim 1, wherein:
    the input voltage (Vin) accepted by the wireless power TX is the DC voltage produced by the adaptor, or is produced by a further DC-DC converter that is between the adaptor and the wireless power TX;
    the closed-loop DC-DC converter of the first charger comprises a buck charger;
    the open-loop DC-DC converter of the second charger comprises a switched capacitor charger;
    the charging phases include a pre-charge phase, a constant current buck phase, a constant current switched capacitor phase, a constant voltage switched capacitor phase, and a constant voltage buck phase;
    the controller is configured to enable the first charger and disable the second charger during the pre-charge phase, the constant current buck phase, and the constant voltage buck phase;
    and the controller is configured to enable the second charger and disable the first charger during the constant current switched capacitor phase and the constant voltage switched capacitor phase.

4. The system of claim 3, wherein:
the pre-charge phase corresponds to when a battery charging voltage (Vbat) is below a first voltage threshold (Vlow);
the constant current buck phase corresponds to when the battery charging voltage (Vbat) is between the first voltage threshold (Vlow) and a second voltage threshold (Vsc_min);
the constant current switched capacitor phase corresponds to when the battery charging voltage (Vbat) is between the second voltage threshold (Vsc_min) and a third voltage threshold (Vcv_buck);
the constant voltage switched capacitor phase corresponds to when the battery charging voltage (Vbat) is greater than a fourth voltage threshold (Vcv_sc); and
the constant voltage buck phase corresponds to when the battery charging voltage (Vbat) is greater than the third voltage threshold (Vcv_buck) or the battery charging current (Ichg) is less than a current threshold (Isc_min).

5. The system of claim 3, wherein during the constant current switch capacitor phase:
the input voltage (Vin) provided to the wireless power TX is adjusted to cause a battery charging current to stay close to a target charging current; and
the output voltage (Vout) produced by the wireless power RX is adjusted to cause a voltage gain of the system to stay close to a target voltage gain, or to cause the operating frequency of the system to stay close to a target frequency.

6. The system of claim 3, wherein during the constant current switch capacitor phase:
the output voltage (Vout) produced by the wireless power RX is adjusted to cause a battery charging current to stay close to a target charging current; and
the input voltage (Vin) provided to the wireless power TX is adjusted to cause a voltage gain of the system to stay close to a target voltage gain, or to cause an operating frequency of the system to stay close to a target operating frequency.

7. The system of claim 3, wherein during the constant current switch capacitor phase:
the output voltage (Vout) produced by the wireless power RX is adjusted to cause a battery charging current to stay close to a target charging current, while the input voltage (Vin) provided to the wireless power TX is fixed.

8. The system of claim 3, wherein during the constant voltage switch capacitor phase:
the input voltage (Vin) provided to the wireless power TX is adjusted to cause the battery charging voltage to stay close to a target voltage; and
the output voltage (Vout) produced by the wireless power RX is adjusted to cause a voltage gain of the system to stay close to a target voltage gain, or to cause an operating frequency of the system to stay close to a target operating frequency.

9. The system of claim 3, wherein during the constant voltage switch capacitor phase:
the output voltage (Vout) produced by the wireless power RX is adjusted to cause the battery charging voltage to stay close to a target voltage; and
the input voltage (Vin) provided to the wireless power TX is adjusted to cause a voltage gain of the system to stay close to a target voltage gain, or to cause an operating frequency of the system to stay close to a target operating frequency.

10. The system of claim 3, wherein during the constant voltage switch capacitor phase:
the output voltage (Vout) produced by the wireless power RX is adjusted to cause the battery charging voltage to stay close to a target voltage, while the input voltage (Vin) provided to the wireless power TX is fixed.

11. A method for wirelessly charging a battery of an electronic device, the method comprising:
converting an alternating current (AC) voltage, received from an AC power supply, into a direct current (DC) voltage, the converting performed by an adaptor;
accepting, at a wireless power transmitter (TX), an input voltage (Vin), wherein the input voltage (Vin) accepted by the wireless power TX is based on the DC voltage produced by the adaptor
transmitting power wirelessly from the wireless power TX to a wireless power receiver (RX), the transmitting performed in dependence on the input voltage (Vin) provided to the wireless power TX;
receiving power wirelessly, at the wireless power RX, from the wireless power TX;
producing a DC output voltage (Vout) in dependence on the power wirelessly received by the wireless power RX;
during a first set of charging phases enabling a first charger and disabling a second charger and converting the DC output voltage (Vout) to a battery charging voltage (Vbat) using the first charger, the first charger comprising a closed-loop DC-DC converter; and
during a second set of charging phases disabling the first charger and enabling the second charger and converting the DC output voltage (Vout) to the battery charging voltage (Vbat) using the second charger, the second charger comprising an open-loop DC-DC converter.

12. The method of claim 11, wherein:
the closed-loop DC-DC converter of the first charger comprises a buck charger; and
the open-loop DC-DC converter of the second charger comprises a switched capacitor charger, a load switch charger, or a flash charging charger.

13. The method of claim 11, wherein:
the input voltage (Vin) accepted by the wireless power TX is the DC voltage produced by the adaptor, or is produced by a further DC-DC converter that is between the adaptor and the wireless power TX;
the closed-loop DC-DC converter of the first charger comprises a buck charger;
the open-loop DC-DC converter of the second charger comprises a switched capacitor charger;
the charging phases include a pre-charge phase, a constant current buck phase, a constant current switched capacitor phase, a constant voltage switched capacitor phase, and a constant voltage buck phase;
the first charger is enabled and the second charger is disable during the pre-charge phase, the constant current buck phase, and the constant voltage buck phase; and
the second charger is enabled and the first charger is disable during the constant current switched capacitor phase and the constant voltage switched capacitor phase.

14. The method of claim 13, wherein:
the pre-charge phase corresponds to when a battery charging voltage (Vbat) is below a first voltage threshold (Vlow);

the constant current buck phase corresponds to when the battery charging voltage (Vbat) is between the first voltage threshold (Vlow) and a second voltage threshold (Vsc_min);

the constant current switched capacitor phase corresponds to when the battery charging voltage (Vbat) is between the second voltage threshold (Vsc_min) and a third voltage threshold (Vcv_buck);

the constant voltage switched capacitor phase corresponds to when the battery charging voltage (Vbat) is greater than a fourth voltage threshold (Vcv_sc); and the constant voltage buck phase corresponds to when the battery charging voltage (Vbat) is greater than the third voltage threshold (Vcv_buck) or the battery charging current (Ichg) is less than a current threshold (Isc_min).

15. The method of claim 13, further comprising during the constant current switch capacitor phase:

adjusting the input voltage (Vin) provided to the wireless power TX to cause a battery charging current (Ichg) to stay close to a target charging current; and adjusting the output voltage (Vout) produced by the wireless power RX to cause a voltage gain to stay close to a target voltage gain, or to cause an operating frequency to stay close to a target operating frequency.

16. The method of claim 13, further comprising during the constant current switch capacitor phase:

adjusting the output voltage (Vout) produced by the wireless power RX to cause a battery charging current (Ichg) to stay close to a target charging current; and adjusting the input voltage (Vin) provided to the wireless power TX to cause a voltage gain to stay close to a target voltage gain, or to cause an operating frequency to stay close to a target operating frequency.

17. The method of claim 13, further comprising during the constant current switch capacitor phase:

adjusting the output voltage (Vout) produced by the wireless power RX to cause a battery charging current to stay close to a target charging current, while the input voltage (Vin) provided to the wireless power TX is fixed.

18. The method of claim 13, further comprising during the constant voltage switch capacitor phase:

adjusting the input voltage (Vin) provided to the wireless power TX to cause the battery charging voltage (Vbat) to stay close to a target voltage; and adjusting the output voltage (Vout) produced by the wireless power RX to cause a voltage gain to stay close to a target voltage gain, or to cause an operating frequency to stay close to a target operating frequency.

19. The method of claim 13, further comprising during the constant voltage switch capacitor phase:

adjusting the output voltage (Vout) produced by the wireless power RX to cause the battery charging voltage to stay close to a target voltage; and adjusting the input voltage (Vin) provided to the wireless power TX to cause a voltage gain to stay close to a target voltage gain, or to cause an operating frequency to stay close to a target operating frequency.

20. The method of claim 13, further comprising:

during the constant voltage switch capacitor phase, adjusting the output voltage (Vout) produced by the wireless power RX to cause the battery charging voltage to stay close to a target voltage, while the input voltage (Vin) provided to the wireless power TX is fixed.

21. A wireless battery charging subsystem for wirelessly charging a battery of an electronic device, the subsystem comprising:

a wireless power receiver (RX) configured to receive power wirelessly from a wireless power transmitter (TX) and in dependence thereon produce a direct current (DC) output voltage (Vout);

a closed-loop charger and an open-loop charger each including a voltage input terminal and a voltage output terminal, the voltage input terminal of each of the chargers accepting the output voltage (Vout) from the wireless power RX, and the voltage output terminal of each of the chargers configured to be coupled to a terminal of the battery that is to be charged; and a controller configured to selectively enable one of the closed-loop or open-loop chargers at a time so that during a first set of charging phases the closed-loop charger is used to charge the battery, and during a second set of the charging phases the open-loop charger is used to charge the battery.

22. The subsystem of claim 21, wherein use of both the closed-loop and open-loop chargers provides for greater efficiency than using just the closed-loop charger.

23. The subsystem of claim 21, wherein:

the closed-loop charger comprises a buck charger; and the open-loop charger comprises a switched capacitor charger.

24. A method for wirelessly charging a battery of an electronic device, the method comprising:

receiving power wirelessly, at a wireless power receiver (RX), from a wireless power transmitter (TX);

producing a direct current (DC) output voltage (Vout) in dependence on the power wirelessly received by the wireless power RX;

during a first set of charging phases enabling a closed-loop charger and disabling an open-loop charger and converting the DC output voltage (Vout) to a battery charging voltage (Vbat) using the closed-loop charger; and during a second set of charging phases disabling the closed-loop charger and enabling the open-loop charger and converting the DC output voltage (Vout) to the battery charging voltage (Vbat) using the open-loop charger.

25. The method of claim 24, wherein use of both the closed-loop and open-loop chargers provides for greater efficiency than using just the closed-loop charger.

26. The method of claim 24, wherein:

the closed-loop charger comprises a buck charger; and the open-loop charger comprises a switched capacitor charger.

* * * * *